US012772983B2

(12) United States Patent
Curnett et al.

(10) Patent No.: US 12,772,983 B2
(45) Date of Patent: Oct. 27, 2026

(54) INTESTINE SQUEEZE CONVEYOR FOR LIVESTOCK INTESTINE WASHING MACHINE

(71) Applicant: Hantover, Inc., Overland Park, KS (US)

(72) Inventors: Ronald J. Curnett, Cross Timbers, MO (US); Craig E. Feeler, Independence, MO (US)

(73) Assignee: Hantover, Inc., Overland Park, KS (US)

( * ) Notice: Subject to any disclaimer, the term of this patent is extended or adjusted under 35 U.S.C. 154(b) by 0 days.

(21) Appl. No.: 19/037,170

(22) Filed: Jan. 25, 2025

(65) Prior Publication Data

US 2025/0241321 A1 Jul. 31, 2025

Related U.S. Application Data

(60) Provisional application No. 63/625,684, filed on Jan. 26, 2024.

(51) Int. Cl.
*A22C 17/16* (2006.01)
*B08B 9/032* (2006.01)

(52) U.S. Cl.
CPC ............ *A22C 17/16* (2013.01); *B08B 9/0321* (2013.01); *B08B 2209/032* (2013.01)

(58) Field of Classification Search
CPC ...................................................... A22C 17/16
(Continued)

(56) References Cited

U.S. PATENT DOCUMENTS 1,077,488 A * 11/1913 Olsen ..................... A22C 17/16 452/123
2,701,386 A * 2/1955 Strickler ................ A22C 17/16 452/123

(Continued)

FOREIGN PATENT DOCUMENTS

CN 105901107 * 8/2016
DE 2260865 * 6/1974
EP 2308315 * 7/2016

OTHER PUBLICATIONS

English translation of EP Patent No. 2308315 to Holdijk, published Jul. 27, 2016.*

(Continued)

*Primary Examiner* — David J Parsley
(74) *Attorney, Agent, or Firm* — Hovey Williams LLP

(57) ABSTRACT

An intestine cleaning machine includes a rotatable drum presenting an intestine-supporting surface, a nozzle assembly coupled to the drum, and an intestine squeeze conveyor assembly. The nozzle assembly is operable to discharge a cleaning fluid into the intestine as the drum is rotated. The squeeze conveyor assembly includes a frame assembly, and first and second spaced apart intestine-conveying elements configured to receive the intestine therebetween. The intestine-conveying elements cooperatively define opposed intestine-engaging surfaces that are moveable in a common direction. At least one of the intestine-conveying elements is adjustably supported relative to the frame assembly to permit adjustment of a spacing between the intestine-conveying elements, such that adjustment of the spacing between the intestine-conveying elements permits pressure to be exerted against the intestine as the intestine is moved by and between the intestine-engaging surfaces.

10 Claims, 14 Drawing Sheets

(58) Field of Classification Search
USPC .......................................................... 452/123
See application file for complete search history.

(56) References Cited

U.S. PATENT DOCUMENTS

| | | | | | |
|---|---|---|---|---|---|
| 3,509,593 | A * | 5/1970 | De Moss | A22C 17/16 | 452/123 |
| 5,820,453 | A * | 10/1998 | Burke | A22C 17/16 | 452/173 |
| 5,873,775 | A | 2/1999 | Landahl et al. | | |
| 6,083,096 | A * | 7/2000 | Carrillo | A22C 17/16 | 452/173 |
| 6,315,654 | B1 * | 11/2001 | Levsen | A22C 17/16 | 452/173 |
| 6,468,145 | B1 * | 10/2002 | Houtz | A22C 17/16 | 452/173 |
| 6,692,344 | B2 * | 2/2004 | Burke | A22C 17/14 | 452/123 |
| 7,261,628 | B2 | 8/2007 | Levsen | | |
| 7,828,636 | B2 * | 11/2010 | Larson | A22C 17/16 | 452/173 |
| 8,216,031 | B2 | 7/2012 | Kleinsasser | | |
| 10,034,481 | B1 * | 7/2018 | Levsen | A22C 17/16 | |
| 10,034,482 | B1 * | 7/2018 | Levsen | A22C 17/16 | |
| 2009/0075578 | A1 | 3/2009 | Fulcher et al. | | |

OTHER PUBLICATIONS

International Search Report and Written Opinion for PCT Application No. PCT/US2025/013082 (Dated May 16, 2025).

* cited by examiner

INTESTINE SQUEEZE CONVEYOR FOR LIVESTOCK INTESTINE WASHING MACHINE

CROSS REFERENCE TO RELATED APPLICATIONS

This application claims priority benefit of U.S. Provisional Patent Application No. 63/625,684 filed Jan. 26, 2024, and titled LIVESTOCK INTESTINE WASHING MACHINE. The foregoing application is hereby incorporated by reference in its entirety.

FIELD OF THE DISCLOSURE

The present invention relates generally to a machine for flushing and cleaning intestines with fluid, and more particularly, to an intestine squeeze conveyor assembly for facilitating removal of cleaning fluid from the intestine.

BACKGROUND

Those ordinarily skilled in the art will appreciate that cleaning intestines is traditionally accomplished by agitating the intestines in a chamber with washing fluid, and possibly removing fat from the intestines using scarifying materials or the like. In more recent machines, rotatable drums including flights may receive the intestines along an outer surface and rotate while cleaning fluid is flushed along the inside and outside of the intestines.

Rotating drums may provide accelerated cleaning over the aforementioned chamber-based cleaning machine. However, such rotatable drum-based systems introduce significant cleaning fluid waste and potential safety concerns for operators. Over the course of a cleaning cycle using an existing machine, cleaning fluid is periodically (at least) lost from the machine and collects on surrounding surfaces. In addition, excess cleaning fluid often remains in the internal chamber of the cleaned intestine. Moreover, existing fluid controls often require an operator to stop the drum following each cleaning cycle in order to replace cleaned intestines with unclean intestines. Each of the shortcomings outlined above results in significant waste of time and/or cleaning fluid in existing systems for cleaning intestines.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, an intestine cleaning machine is provided. The intestine cleaning machine is operable to clean an intestine having an open intestine end. The intestine cleaning machine includes a rotatable drum presenting an intestine-supporting surface, a nozzle assembly coupled to the drum, and an intestine squeeze conveyor. The nozzle assembly is operable to discharge a cleaning fluid into the intestine as the drum is rotated. The intestine squeeze conveyor assembly includes a frame assembly, and first and second spaced apart intestine-conveying elements configured to receive the intestine therebetween. The intestine-conveying elements cooperatively define opposed intestine-engaging surfaces that are moveable in a common direction. At least one of the intestine-conveying elements is adjustably supported relative to the frame assembly to permit adjustment of a spacing between the intestine-conveying elements, such that adjustment of the spacing between the intestine-conveying elements permits pressure to be exerted against the intestine as the intestine is moved by and between the intestine-engaging surfaces.

In another aspect, an intestine squeeze conveyor assembly is provided. The squeeze assembly is for use in an intestine cleaning machine, wherein the intestine cleaning machine includes a rotatable drum configured to support an intestine as the intestine is injected with cleaning fluid. The intestine squeeze conveyor assembly includes a frame assembly, first and second spaced apart intestine-conveying elements configured to receive the intestine therebetween, and an intestine-receiving chute for directing the intestine from the drum to the intestine-conveying elements. The intestine-conveying elements cooperatively define opposed intestine-engaging surfaces that are moveable in a common direction. The intestine-engaging surfaces define an intestine-receiving location. At least one of the intestine-conveying elements is adjustably supported by the frame assembly to permit adjustment of a spacing between the intestine-conveying elements, such that adjustment of the spacing between the intestine-conveying elements permits pressure to be exerted against the intestine as the intestine is moved by and between the intestine-engaging surfaces. The intestine-receiving chute defines a discharge location adjacent the intestine-receiving location.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The drawing figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
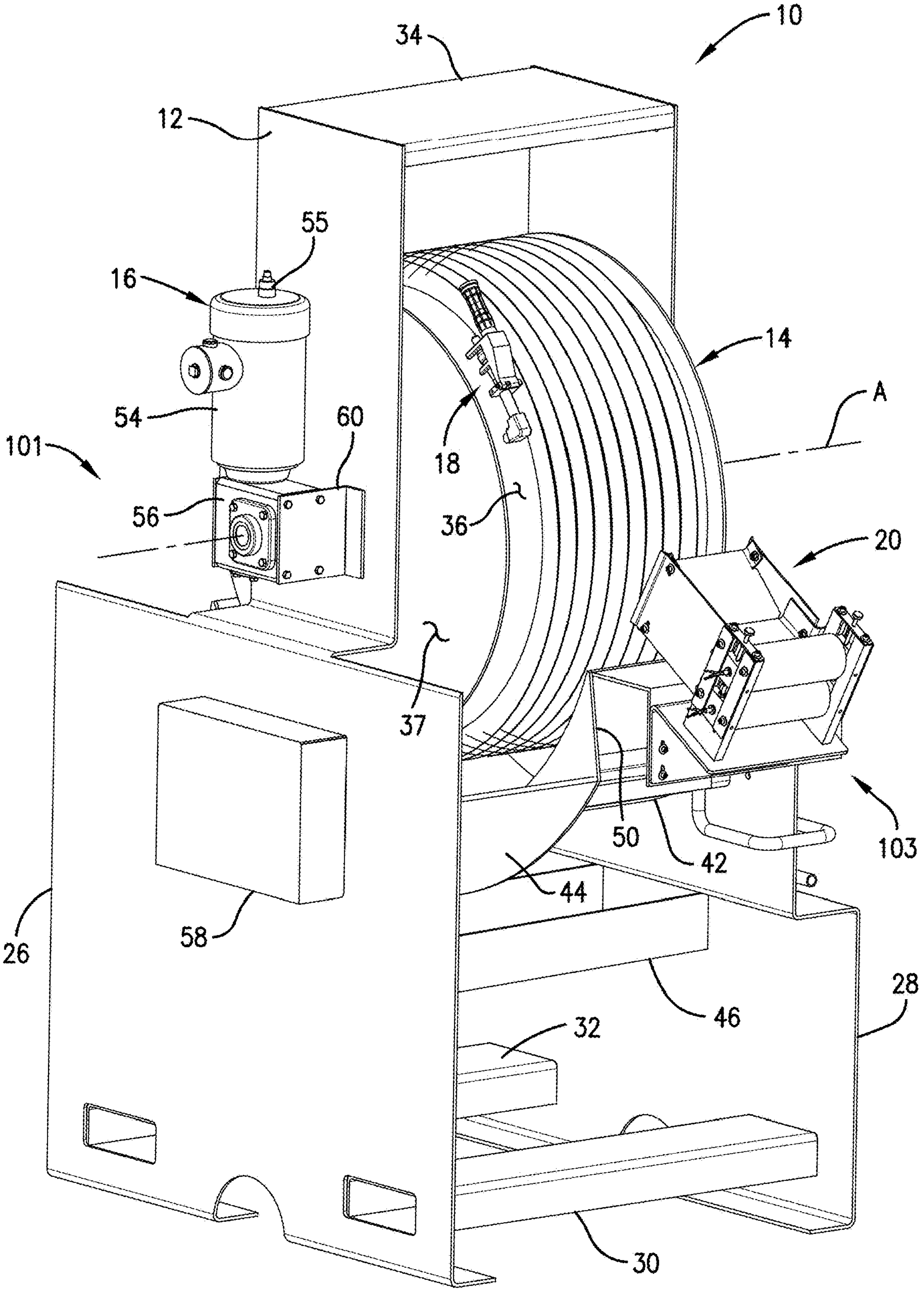
FIG. 1 is a perspective view of an intestine cleaning machine constructed in accordance with the principles of the present invention, particularly showing a drive end of the machine.

Unless otherwise indicated, the drawing figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying drawing figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claim, along with the full scope of equivalents to which such claim is entitled.

Figure 2:
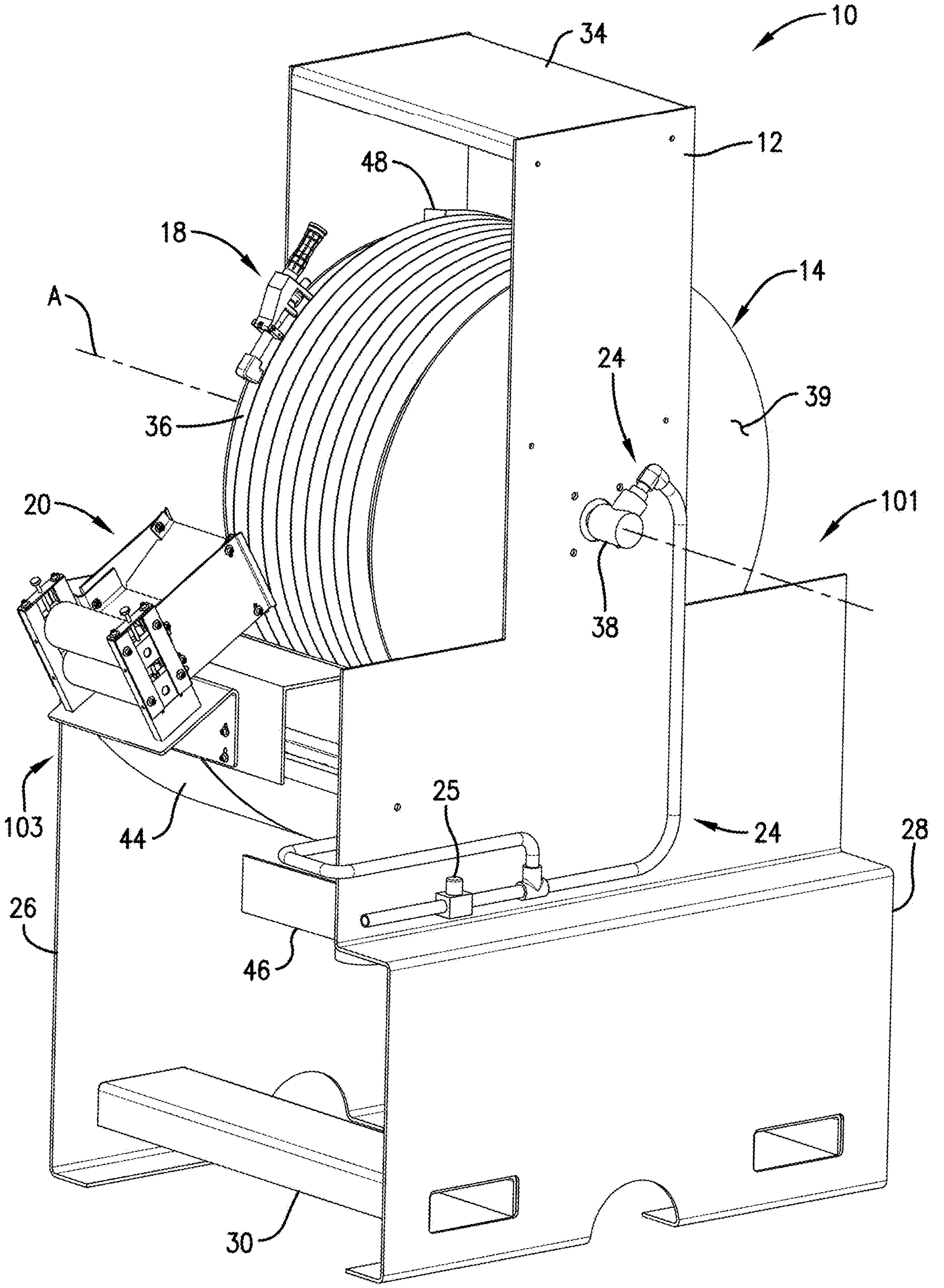
FIG. 2 is a perspective view of the intestine cleaning machine of FIG. 1, depicting a fluid supply end of the machine.
Figure 3:
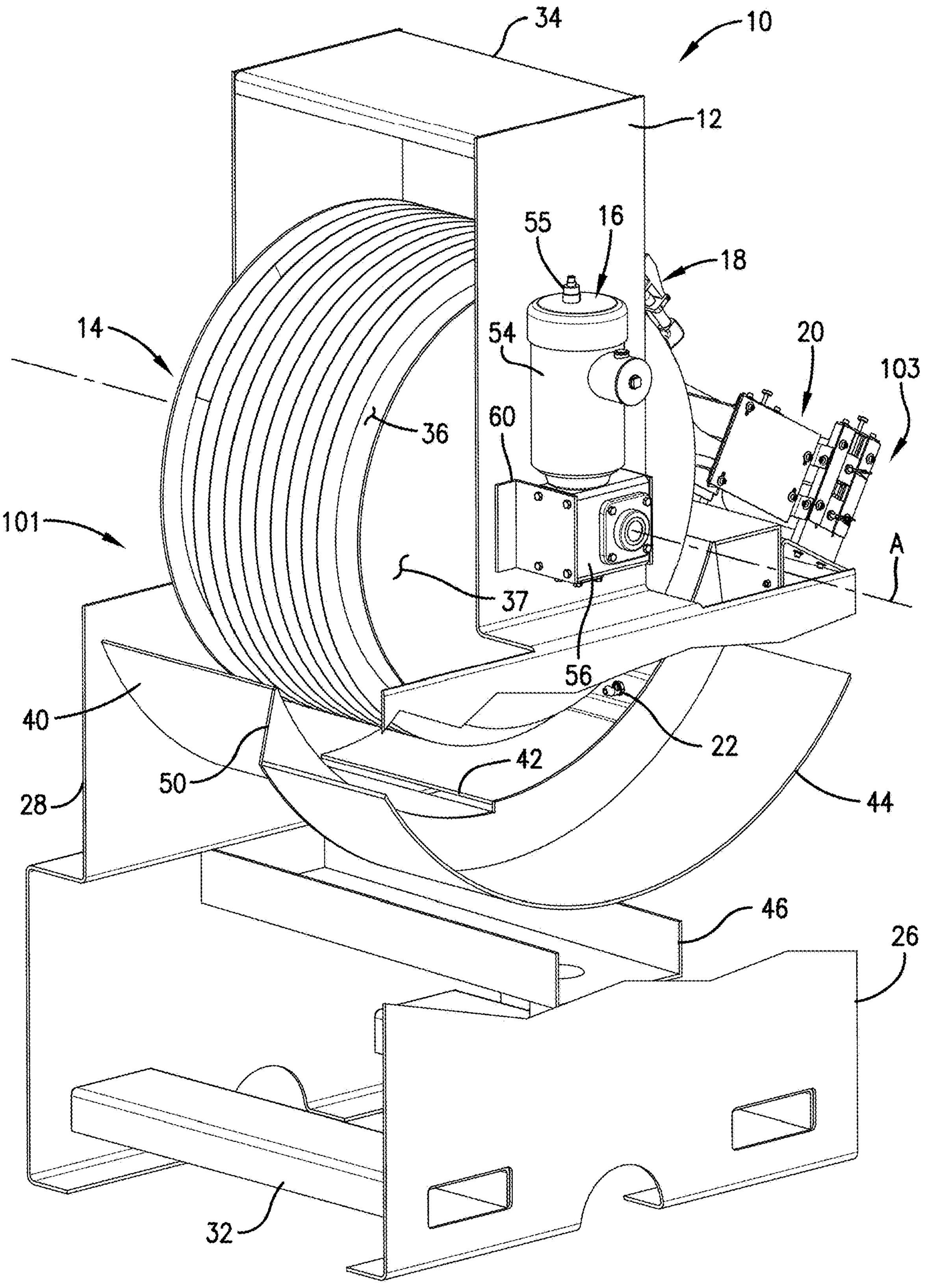
FIG. 3 is a partially exploded perspective view of the intestine cleaning machine of FIG. 1, depicting collection pans for collecting and draining of discharged debris and fluid.
Figure 4:
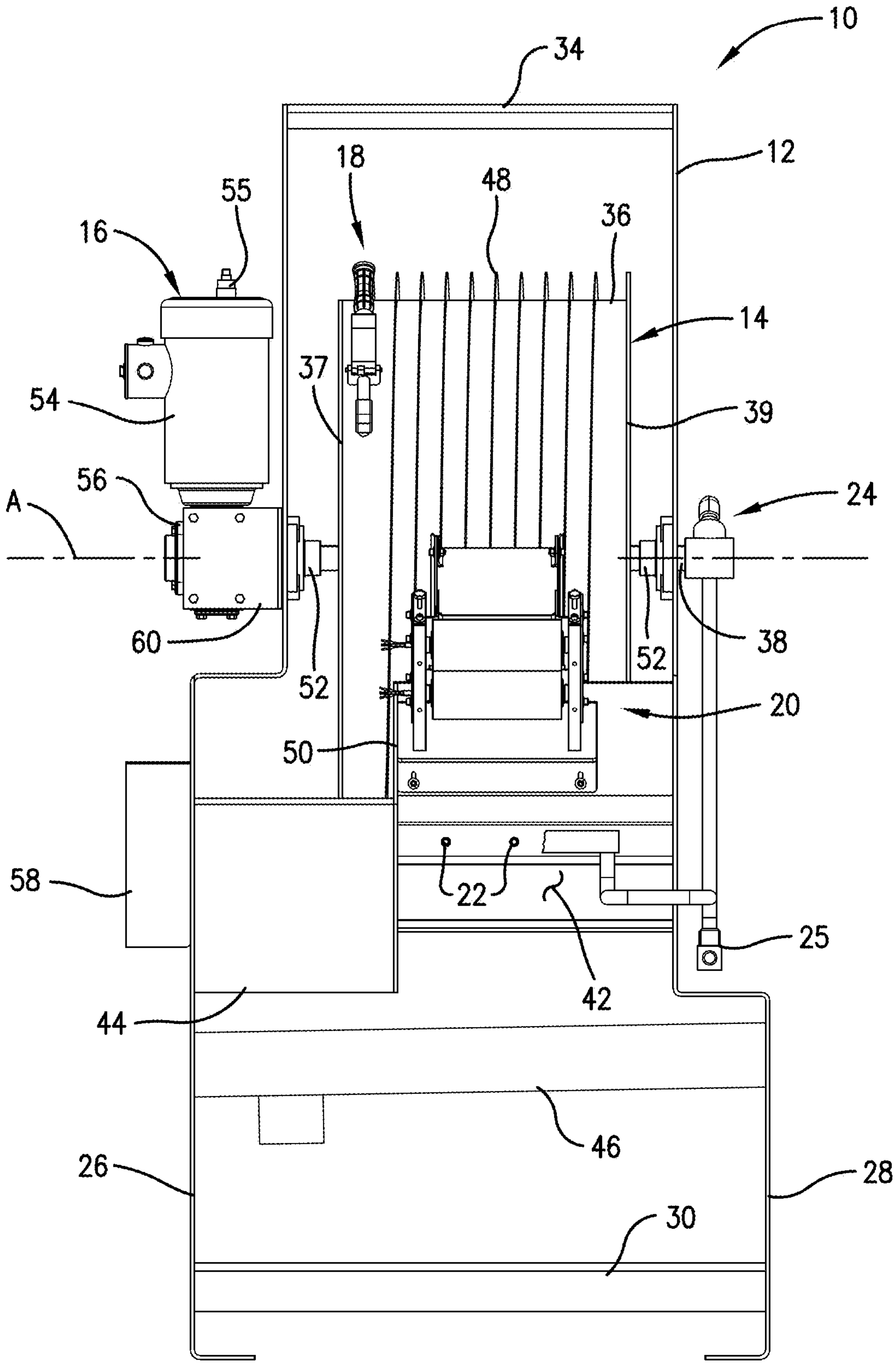
FIG. 4 is a side view of the intestine cleaning machine of FIG. 1, taken from an unloading side of the machine.
Figure 6:
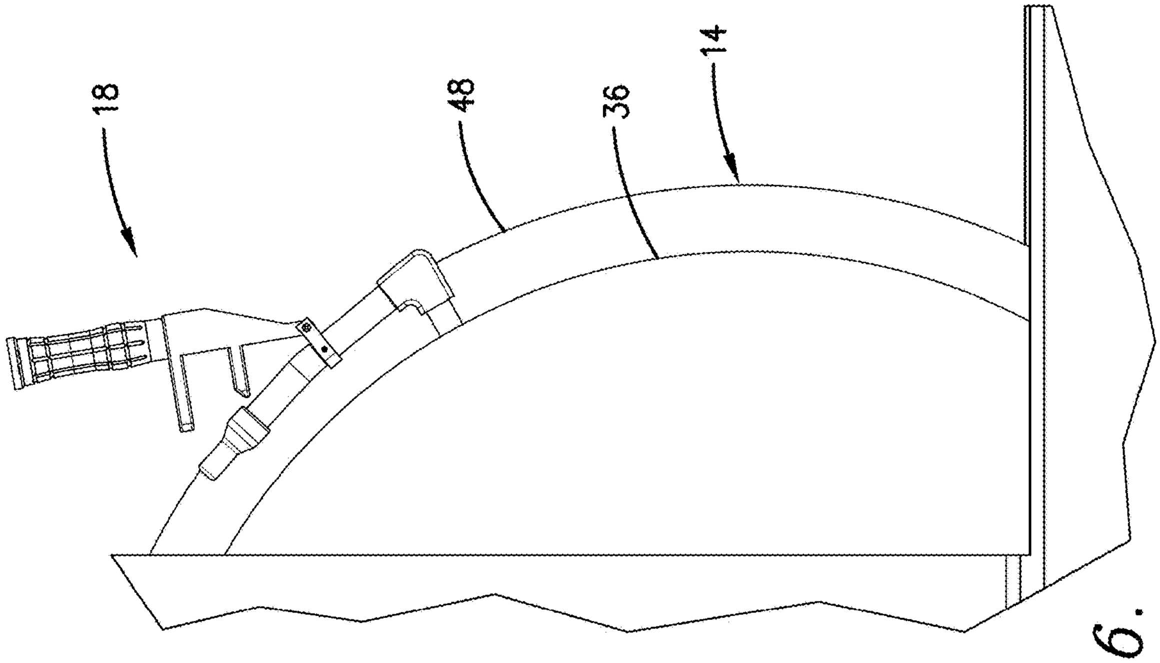
FIG. 6 is a view similar to FIG. 5, but depicting the nozzle assembly in an opened position.
Figure 5:
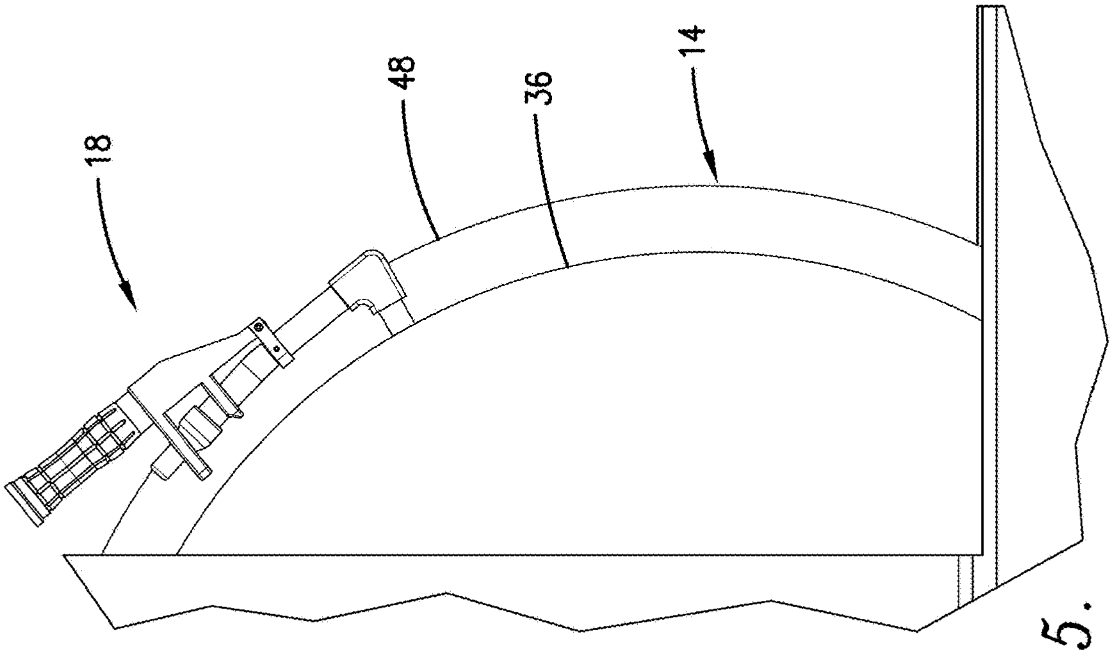
FIG. 5 is an enlarged view of a portion of the intestine cleaning machine of FIG. 1, depicting a nozzle assembly of the machine in a closed position.

Referring now to FIGS. 1-2, an intestine cleaning machine 10 constructed in accordance with the principles of the present invention is configured to provide relatively efficient and low-waste cleaning of livestock intestines. Although the machine may be variously configured, it is important that it be capable of supporting and revolving an intestine while flushing the intestine with a fluid.

Figure 14:
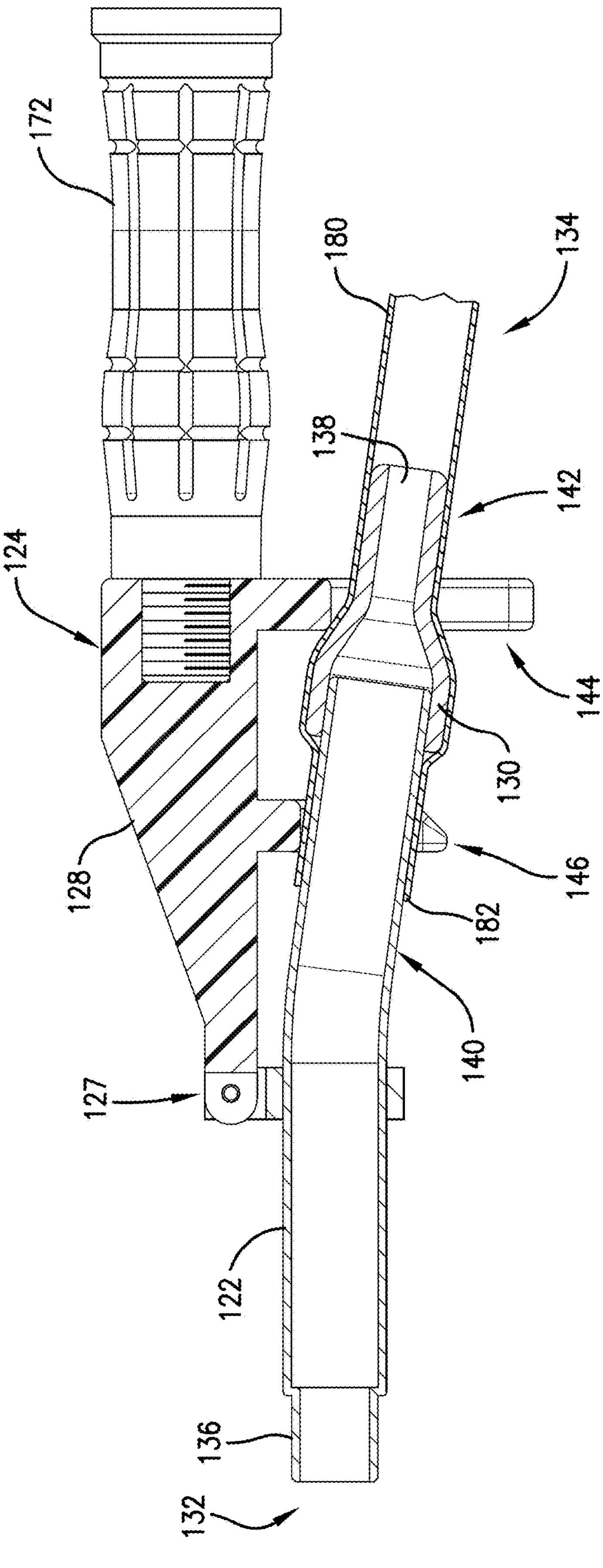
FIG. 14 is a side, partially sectioned view of the nozzle assembly shown in the closed position, with an intestine received and secured to the nozzle assembly.

In the exemplary embodiment, the illustrated machine 10 generally includes a frame 12 supporting a rotatable drum 14; a drive mechanism 16 drivingly connected to the drum 14; a nozzle assembly 18 associated with, or coupled to, the drum 14 for discharging fluid into the intestine 180 (shown in FIG. 14) as the drum 14 is rotated; an intestine squeeze conveyor assembly 20 (broadly, a squeeze conveyor) for facilitating removal of the intestine 180 from the drum 14 and, perhaps more importantly, compressing the intestine to expel the fluid axially toward an open end 182 of the intestine; spray nozzles 22 for spraying fluid onto the outside surface of the intestine; a fluid supply system 24 for supplying fluid to the nozzle assembly 18 and the spray nozzles 22; a solenoid shut-off valve 25 for restricting and/or preventing fluid flow to the nozzle assembly 18; and three (3) arcuate pans 40, 42, and 44 and a collection pan 46 for facilitating collecting and draining of discharged debris and fluid.

As depicted in FIGS. 1-2, the frame 12 preferably has two (2) upright side panels 26 and 28; a pair of lower horizontal cross members 30 and 32, each extending between the upright side panels 26 and 28; and an upper horizontal cross member 34 positioned atop and extending between the upright side panels 26 and 28. The three (3) arcuate pans 40, 42, and 44 extend between the upright side panels 26 and 28. In particular, the arcuate pan 40, which is positioned proximate a loading side 101 of the cleaning machine 10, and the arcuate pan 42, which is positioned proximate an unloading side 103 of the cleaning machine 10, extend from the side panel 28. The arcuate pan 44 extends from the side panel 26. Distal ends of the arcuate pans 40 and 42 are coupled to the distal end of the arcuate pan 44 via a transition member 50. The collection pan 46 extends between each of the upright side panels 26 and 28. As depicted in FIGS. 1-6, the drum 14 is received and supported between the upright side panels 26 and 28.

It will be appreciated that the frame 12 is configured for placement on a generally flat or planar surface (e.g., a livestock processing plant floor) so that the drum 14 is spaced above the surface at a convenient height (e.g., the drum 14 may be positioned so that its center rotational axis "A" is approximately three (3) to five (5) feet above the surface). However, it is entirely within the ambit of the present invention to utilize any other alternative frame design that is capable of rotatably supporting the drum 14, such as a ceiling or wall mounted frame. The frame 12 can be constructed from any suitable material (e.g., stainless steel) sufficient to support the machine.

In the example embodiments, the components of the frame 12, such as the upright side panels 26 and 28; the three (3) arcuate pans 40, 42, and 44; the transition 50; the collection pan 46; and the horizontal cross members 30, 32, and 34, may to attached together by any suitable means (e.g., welding, fasteners, etc.), although various other materials and means for associating the components of the frame 12 may be used.

In the example embodiment, the rotatable drum 14 presents an outer intestine-supporting surface 36 extending along the length of the drum. As shown in FIGS. 1-2, the illustrated drum 14 is generally cylindrical in shape (although alternative cross-sectional shapes, such as polygonal, are within the ambit of certain aspects of the preferred embodiment) and presents a center, longitudinal rotational axis "A." Respective ends of the drum 14 are preferably covered by respective end plates 37 and 39 fixed to the drum

14 using any suitable means, such as welding, adhesive, or bolts or other fasteners (not shown), although the end of the drum 14 can alternatively remain open to facilitate maintenance and service.

The drum 14 includes a shaft 38 which extends between a pair of bearing assemblies 52 provided on the upright side panels 26 and 28. The pair of bearing assemblies 52 rotatably support the shaft 38 and thereby support the drum 14 on the frame 12 for relative rotational movement. It will be appreciated that the shaft 38 defines and is positioned along the longitudinal rotational axis “A” of the drum 14.

A flighting 48 extends in a helical arrangement about the intestine-supporting surface 36. In the example, embodiment, the flighting 48 is formed from a plurality of flight sections. In some embodiments, the flight sections are formed from stainless steel. The flight sections are wrapped around and attached to the intestine-supporting surface 36 by any suitable means (e.g., welding, fasteners, etc.), although various other materials and means for associating the flighting with the supporting surface may be used. In some embodiments, the flighting 48 may be formed from a unitary piece of material.

The flighting 48 operates to helically arrange the intestine 180 in a single layer arrangement along the intestine-supporting surface 36 as the drum 14 is rotated. Those skilled in the art will appreciate that intestines are naturally attached to and supported by a fat layer. Along the entire length of the intestine, a portion of its outer surface is covered by fatty tissue remnants of the fat layer. Those skilled in the art will further appreciate that this fatty tissue is not as stretchable as intestinal tissue. This quality will naturally orient the fatty tissue side of the intestine against the intestine-supporting surface 36 and, in combination with the flighting 48, eliminate bends and kinks in the intestine.

To increase the grip of the intestine on the intestine-supporting surface 36, various materials may be adhered to the surface 36. For example, in an embodiment, a coarsely configured silicon carbide may be adhered to the intestine-supporting surface 36, for example, using a resin. In another example, the intestine-supporting surface 36 may be roughened or texturized adjacent the nozzle assembly 18 to enhance the frictional inter-engagement between the intestine and the intestine-supporting surface 36, and thereby restrict longitudinal shifting of the intestine relative to the nozzle assembly 18.

In a preferred embodiment, the drum 14 includes a single set of flighting 48. However, it is noted that any number of sets of flighting can be implemented according to certain aspects of the preferred embodiment. In such alternatives having an additional set(s) of flighting, an additional nozzle and associated branch from a cleaning fluid supply line are preferably provided for use with each additional set of flighting. Additional sets of flighting may be spaced apart along the length of the drum. It is, however, entirely within the ambit of the present invention to arrange multiple sets of flighting immediately one after the other along the length of the drum so that there is no space between the sets. The principles of the present invention are equally applicable to sets of flighting that are wrapped together around the drum so that each convolution or flight of a set is immediately adjacent to a flight of another set.

In an example embodiment, the diameter of the drum 14 is preferably about thirty-two (32) inches. The pitch of the flighting 48 is preferably approximately one and three-quarters (1.75) inches. With these preferable dimensions, rotating the drum 14 in a range between and including about five (5) and seven (7) revolutions should completely load or wrap an intestine onto the intestine-supporting surface 36 of the drum 14. A drum rotation speed may be utilized to complete the loading of the intestine in approximately thirty (30) seconds. It is noted, however, that any workable dimensions, pitch, flighting shape, number of revolutions, and rotation speed could be implemented.

In the exemplary embodiment, the drive mechanism 16 includes an electric motor 54 coupled to a gearbox 56. The illustrated embodiment uses a single speed electric motor controlled by a controller 57 (see FIG. 16) housed in a controller box 58. As depicted in FIGS. 1-6, the gearbox 56 is coupled directly to the shaft 38 of the drum 14. The gearbox 56 is attached to the motor side panel 26 via two (2) motor brackets 60. In a preferred embodiment, the motor 54 is preferably a motor of known construction, such as the MTSP-002-3BD18R IronHorse MTS premium efficiency AC induction motor (part number MTSP-002-3BD18R) sold under the trademark IronHorse®. The gearbox 56 is preferably a gearbox of known construction, such as the WGSS-237-060-HA IronHorse heavy duty worm gearbox (part number WGSS-237-060-HA) sold under the trademark IronHorse®. It is noted, however, that other embodiments could implement any suitable drive mechanism and power source for rotating the drum 14. For example, some embodiments may include a servo motor coupled directly to the shaft 38 of the drum (with no external gearbox or encoder). In addition, the various mechanisms implemented could be positioned in any suitable location. For example, the drive mechanism may alternatively comprise a manual hand crank. Further, the power source may alternatively comprise a variable speed motor, a gas-powered motor, a centralized power source of a processing plant, etc.

In the example embodiment, the drive mechanism 16 includes an encoder assembly 55 coupled to the motor 54. In the exemplary embodiment, the encoder assembly 55 is mounted opposite the gearbox 56. It is noted, however, that in certain embodiments, the encoder assembly may be integrated into the electric motor and/or the gearbox assembly. In the example, the encoder assembly 55 is configured to sense an angular position of the motor 54 and transmit an electronic position signal containing the angular position data corresponding thereto to the controller 57.

In the exemplary embodiment, the encoder assembly 55 is an incremental rotary encoder, which transforms a mechanical angular position of a shaft, such as the motor shaft, into an electronic position signal that can be processed by the controller 57. The controller 57 tracks the angular position, along with a number of complete turns, of the encoder. This enables the controller 57 to determine a number of revolutions of the drum 14 and the rotational speed of the drum 14. In alternative aspects of the present invention, the encoder assembly 55 may include for example, and without limitation, an absolute rotary encoder, an optical rotary encoder, a mechanical rotary encoder, and the like. In other aspects of the present invention, the encoder may be replaced with an electronic transducer that includes, without limitation, an accelerometer or gyroscopic sensor that is coupled to the drum shaft 38 to detect the position of the drum shaft. An absolute rotary encoder provides unique position values (e.g., via discrete voltage outputs) from the moment it is powered up by scanning the position of a coded element of the encoder. All positions of the encoder correspond to a unique value. Thus, any movement of the encoder occurring while the encoder is without power is translated into accurate position values once the encoder is powered up again.

As depicted in FIGS. 1-6, the squeeze conveyor 20 is mounted on the unloading side 103 of the machine 10.

Referring to FIGS. 7-10, the squeeze conveyor 20 includes a frame assembly 62 and first and second spaced apart intestine-conveying elements 64 and 66, respectively. The intestine-conveying elements 64, 66 are configured to receive the intestine therebetween. The intestine-conveying elements 64, 66 cooperatively define opposed intestine-engaging surfaces 68 and 70 that are moveable in a common direction. In the example embodiment, at least one of the intestine-conveying elements 64, 66 is adjustably supported relative to the frame assembly 62 to permit adjustment of a spacing 72 between the intestine-conveying elements 64, 66, and more particularly, the intestine-engaging surfaces 68, 70. In the example, the intestine-engaging surfaces 68, 70 define an intestine-receiving location 92. The adjustment of the spacing 72 permits pressure to be exerted against the intestine as the intestine is moved by and between the intestine-engaging surfaces 68, 70.

In the example embodiment, each of the intestine-conveying elements 64, 66 is drivable. Specifically, each of the intestine-conveying elements 64, 66 comprise a drum motor. In a preferred embodiment, the drum motors are preferably motors of known construction, such as the Rulmeca drum motor 80LS with steel helical gearbox sold under the trademark Rulmeca®.

Each intestine-conveying element 64, 66 includes an outer rotatable roller (a drum shell) and an internal motor (electric or hydraulic) mounted concentrically within and enclosed by the roller. The outer rotatable roller defines a cylindrical structure with an outer conveying surface, such as the intestine-engaging surfaces 68, 70, designed to facilitate conveying the intestine. In some embodiments, the outer conveying surfaces 68, 70 may be provided with a suitable friction enhancing feature (e.g., coated with silicon carbide or be roughened or texturized) to facilitate driving engagement with the intestine. The roller is configured to rotate around its central axis, with rotation of the roller being driven and controlled by the internal motor. In some embodiments, the internal motor may be coupled to a gear train or a direct drive mechanism. (It is within the ambit of certain aspects of the present invention for the rollers to be driven by alternative means. In one such alternative, an external drive may be coupled to one or both of the rollers, e.g., via belt, gear, or chain transmission. It is also contemplated for only one of the rollers to be driven, with the other roller essentially idling and being rotated by contact with the intestine moved by the other driven roller.)

Bearings are positioned to support the roller's rotation, while mounting elements, such as brackets or flanges, enable the intestine-conveying element to be secured to the frame assembly 62. Additionally, the intestine-conveying elements may include an internal encoder configured to sense an angular position of the roller and transmit an electronic position signal containing the angular position data corresponding thereto to the controller 57. This feature provides precise feedback for controlling and monitoring the performance of the intestine-conveying elements.

In the example embodiment, the squeeze conveyor 20 also includes an intestine-receiving chute 74 for directing the intestine from the drum 14 to the intestine-conveying elements 64, 66. The intestine-receiving chute 74 includes a pair of opposed funneling panels 76 and 78. The funneling panels 76, 78 have at least portions thereof that converge toward each other in a direction extending from a chute feed end 80 toward a chute discharge end 82. The chute discharge end 82 is located adjacent the intestine-conveying elements 64, 66. The chute discharge end 82 defines a discharge location 86, which is positioned adjacent an intestine-receiving location 92 of the intestine-conveying rollers 64, 66 (the location 92 being generally defined at the nip point between the rollers 64, 66). In the example, the pair of opposed funneling panels 76, 78 present a discharge spacing dimension 84 adjacent the chute discharge end 82. In an embodiment, the discharge spacing dimension 84 is determined according to a target dimension ratio of the spacing 72 between the intestine-conveying elements 64, 66 to the discharge spacing dimension 84. In an example, the target dimension ratio is in a range between and including about 1:5 to 1:7, although other ratios are with the ambit of certain aspects of the present invention. It is also noted that the funneling panels 76, 78 include straight downstream sections spaced from one another the discharge spacing dimension 84, although certain aspects of the present invention contemplate the straight sections may being alternatively dimensioned, having a continued but slightly different downstream converging angle, etc.

The intestine-receiving chute 74 also includes a pair of opposed side panels 88 and 90. The pair of opposed side panels 88 and 90 are coupled to the opposed funneling panels 76 and 78 to form a funnel-shaped chute for directing the intestine to the intestine-conveying elements 64, 66.

In an embodiment, each respective panel 76, 78, 88, and 90 is formed from a single blank of sheet material. Alternatively, any of the each respective panels 76, 78, 88, and 90 may be fabricated from multiple blanks of sheet material, wherein the blanks are attached together at one or more seams to form the respective panel. In an embodiment, the sheet material may include any suitable sheet material, including, for example, and without limitation, an aluminum or aluminum alloy, a steel or steel alloy, and a plastic or resin material. Certain aspects of the present invention contemplate alternatively constructed chutes, such as a chute formed of a single unitary body (rather than discrete, joined panels).

In an embodiment, the frame assembly 62 includes an adjustable mount 94 configured to adjust the spacing 72 between the intestine-conveying elements 64, 66. The intestine-conveying elements 64, 66 are operably coupled to the adjustable mount 94. In the exemplary embodiment, the adjustable mount 94 is generally symmetrical about a central plane of the squeeze conveyor 20 (although differently constructed ends of the mount are within certain aspects of the present invention). For example, the components of the adjustable mount 94 positioned on either axial end of the intestine-conveying elements 64, 66 are the same. Accordingly, only one side of the adjustable mount 94 (depicted in FIGS. 7 and 8) will be described in detail.

Figure 7:
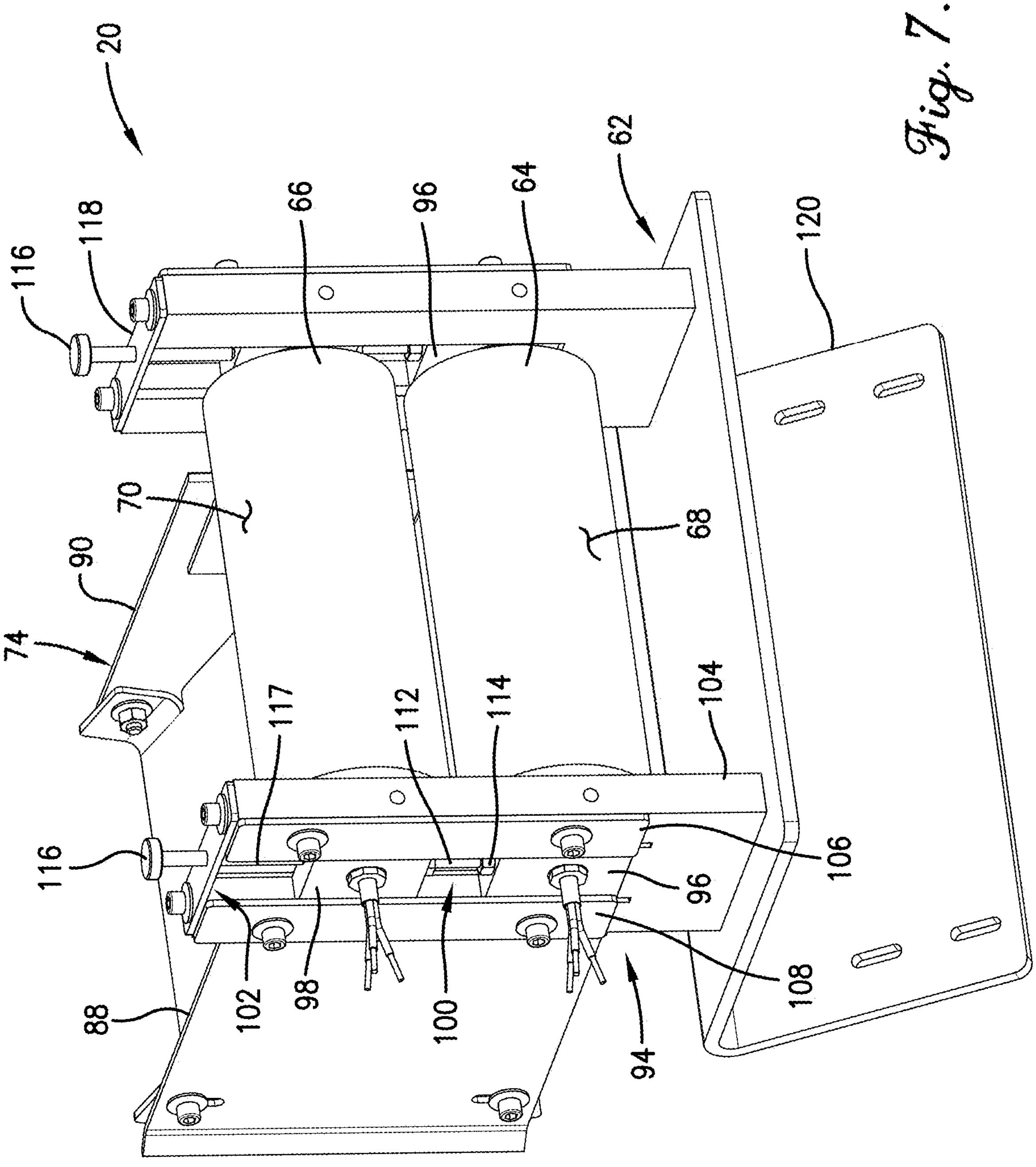
FIG. 7 is a perspective view of an intestine squeeze conveyor assembly of the intestine cleaning machine of FIG. 1, depicting a discharge end of the assembly.
Figure 8:
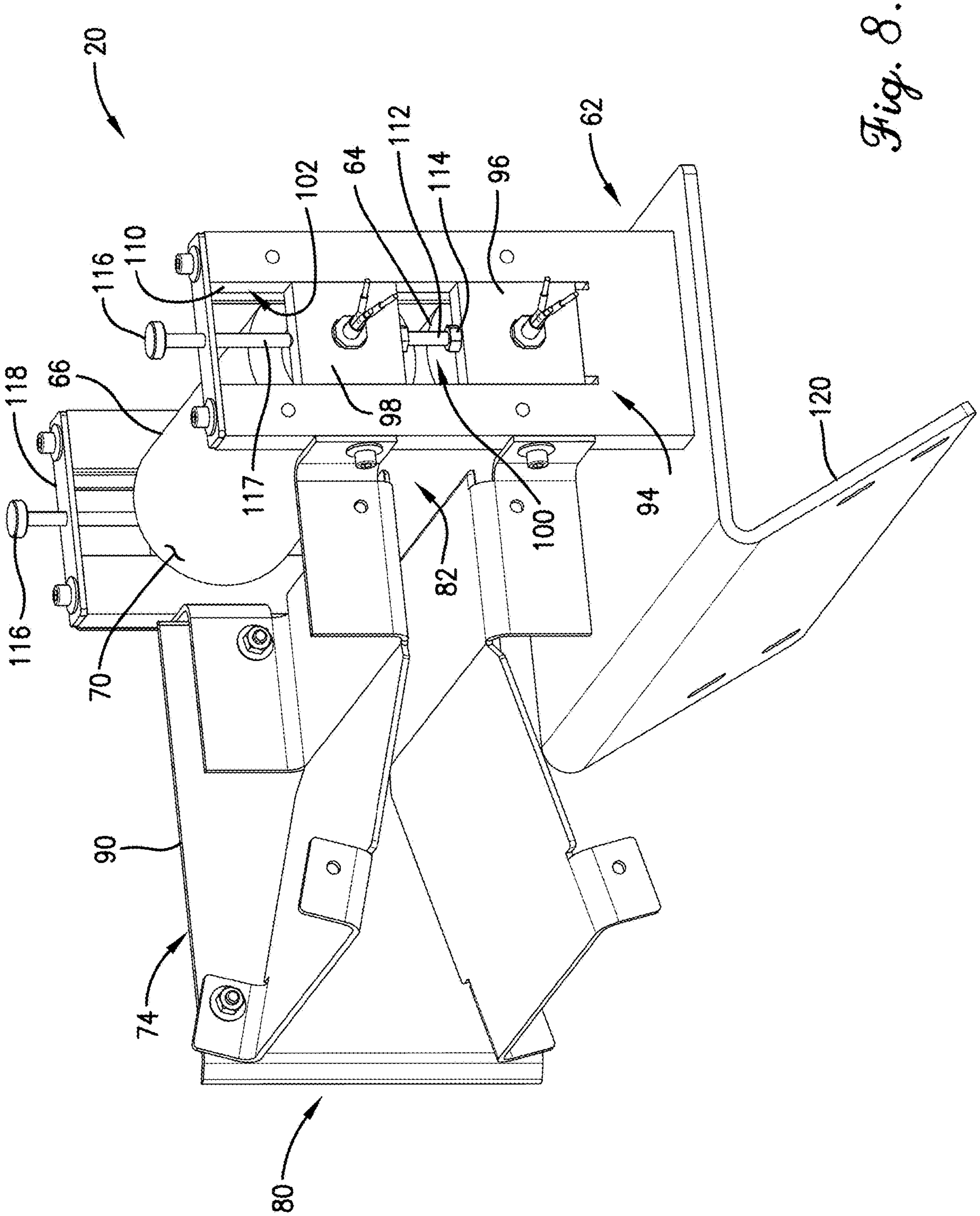
FIG. 8 is a perspective view of the intestine squeeze conveyor assembly of FIG. 7, rotated to depict a feed end of the assembly, and having a portion of the chute and adjustable mount removed to reveal interior portions of the chute and mount assembly.
Figure 9:
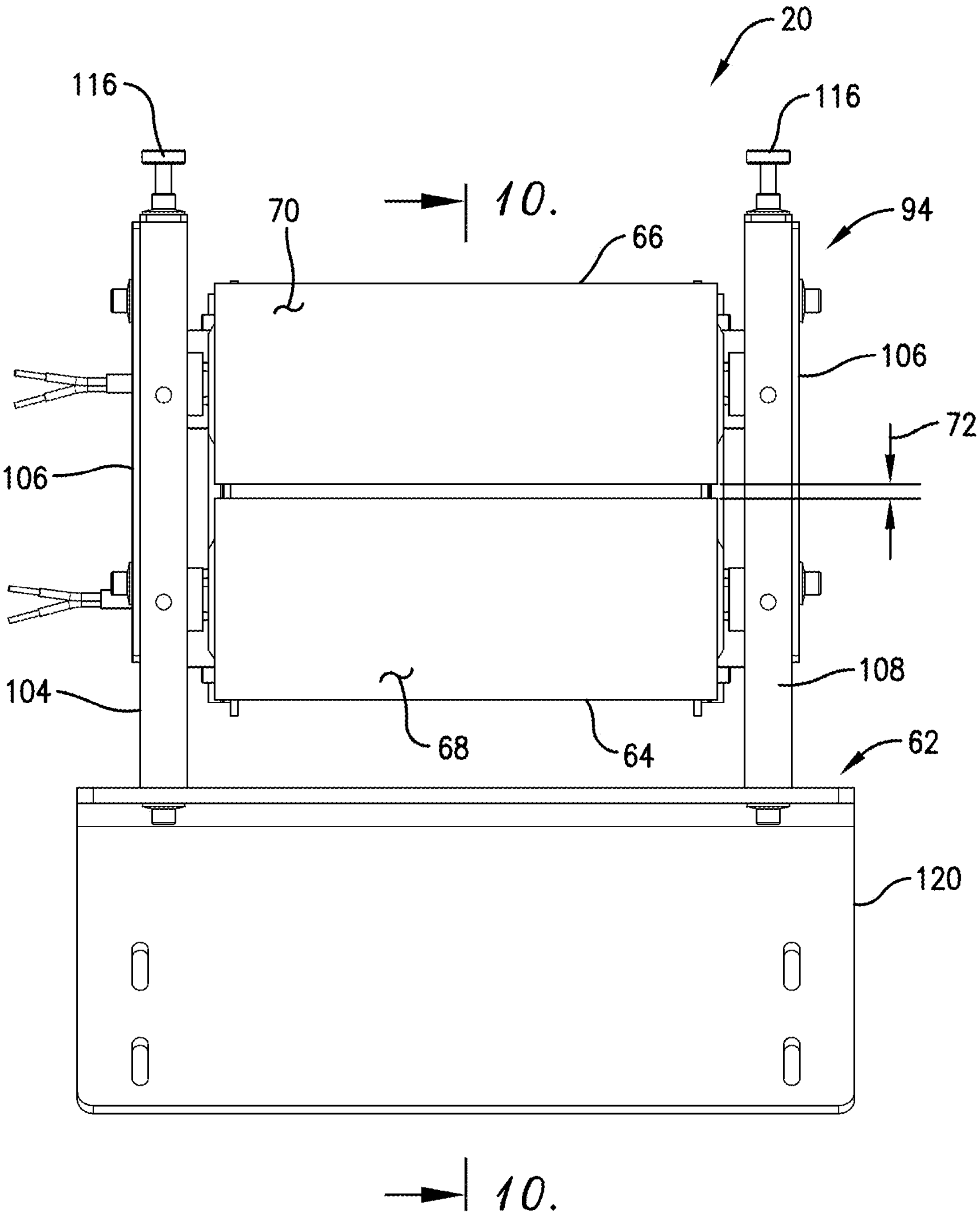
FIG. 9 is an end view of the intestine squeeze conveyor assembly of FIG. 7, taken from the discharge end of the assembly.
Figure 10:
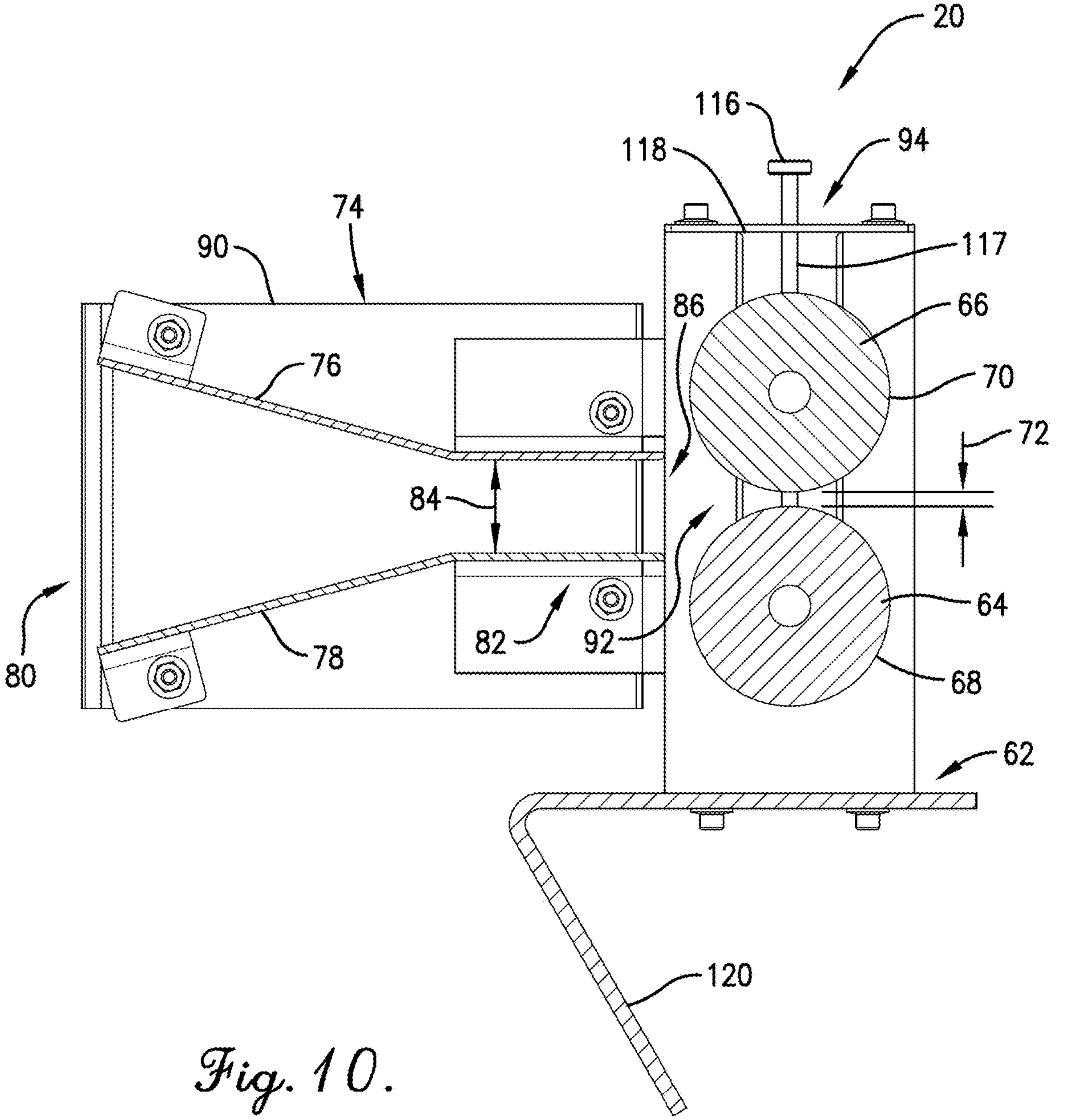
FIG. 10 is a section view of the intestine squeeze conveyor assembly of FIG. 9, taken along line 10-10.
Figure 11:
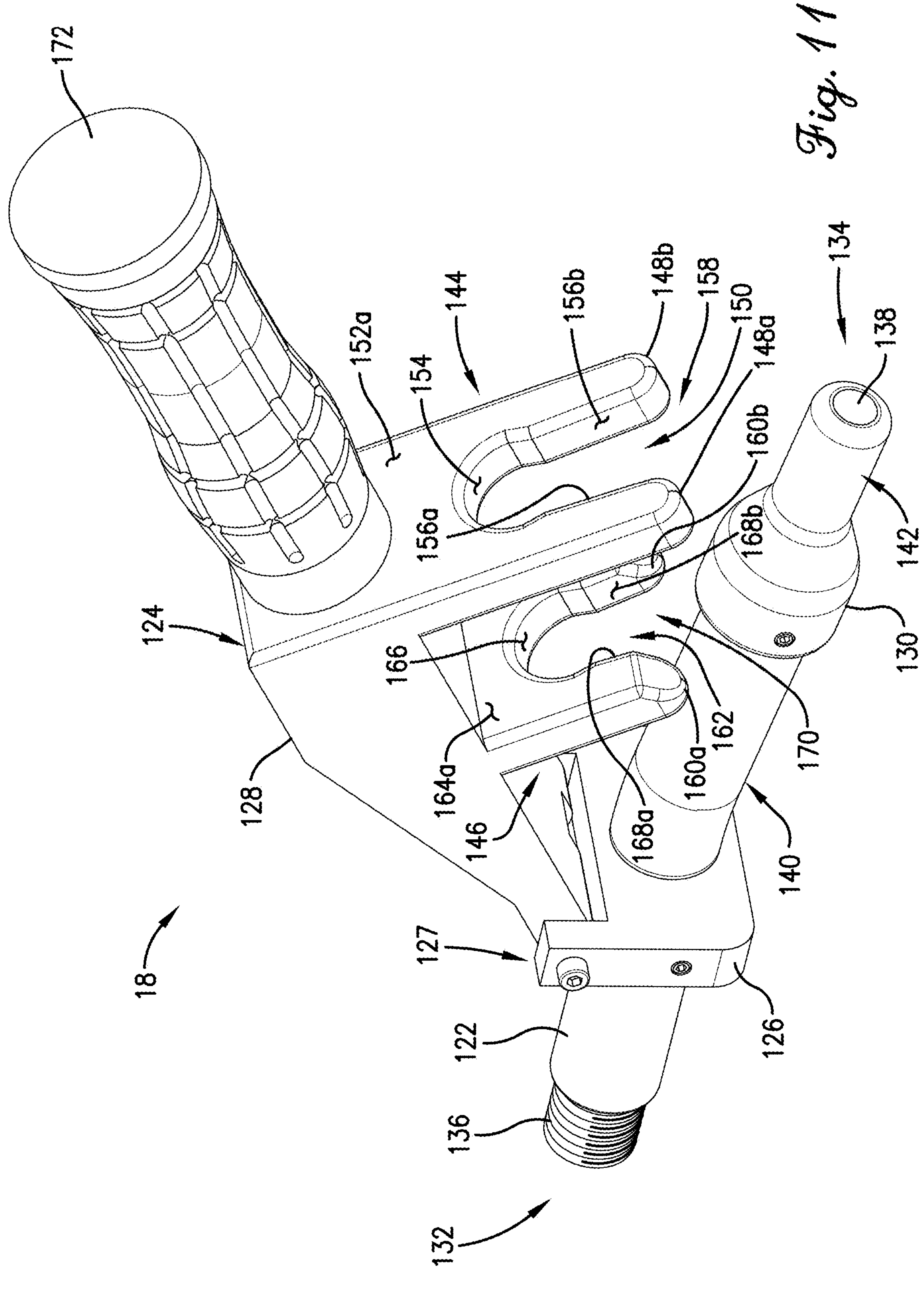
FIG. 11 is a perspective of the nozzle assembly of the intestine cleaning machine of FIG. 1, shown in the opened position.
Figure 12:
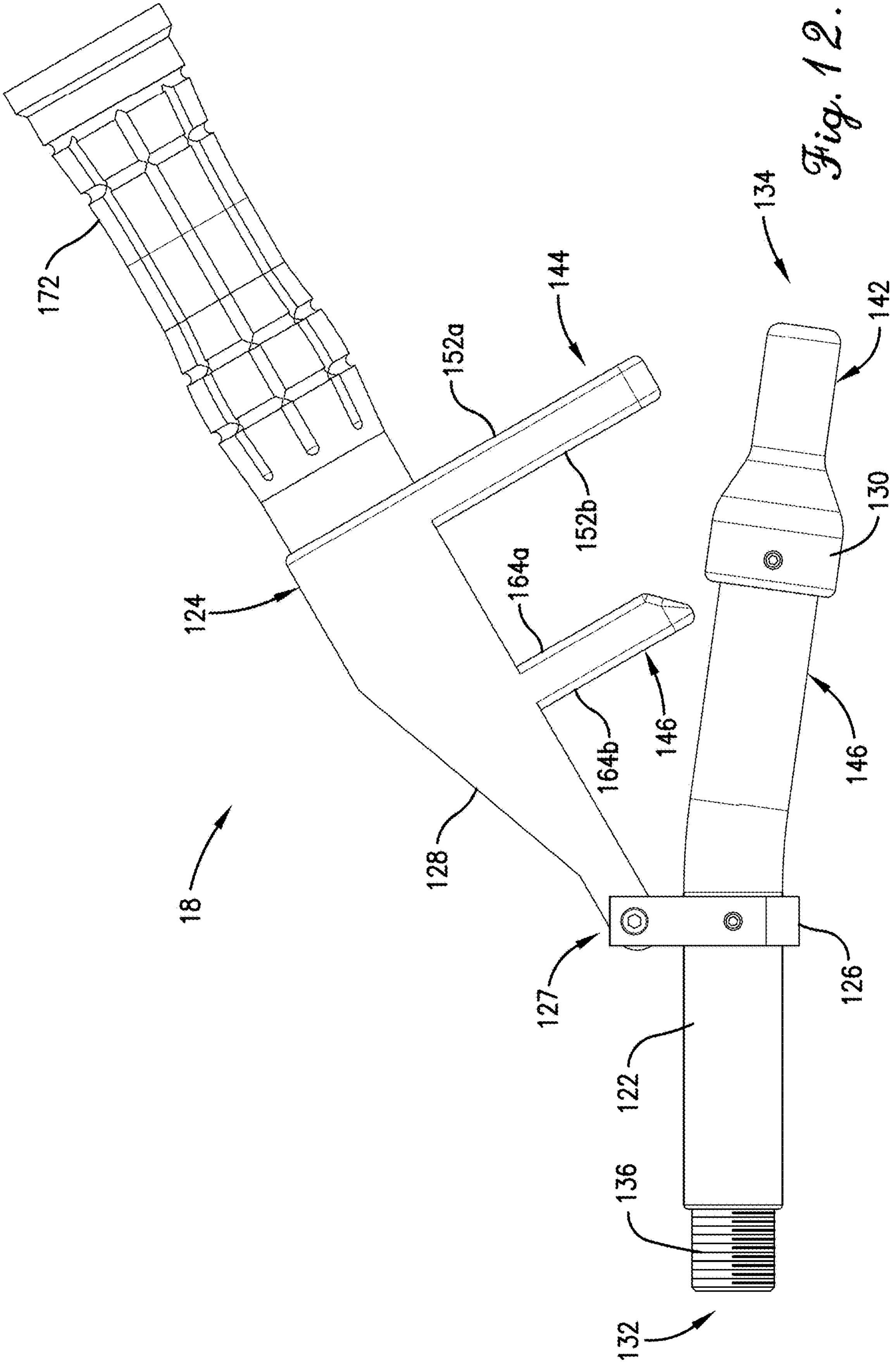
FIG. 12 is a side view of the nozzle assembly as depicted in FIG. 11.

As shown in FIGS. 7 and 8, the adjustable mount 94 includes a generally U-shaped support member 104; a first mounting block 96 coupled to the first intestine-conveying element 64; a second mounting block 98 coupled to the second intestine-conveying element 66; an adjustment mechanism 100 operatively connected to the mounting blocks 96, 98; and a pair of support flanges 106 and 108.

In the example embodiment, the U-shaped support member 104 includes a pair of elongated notches 110 (shown in FIG. 8) defined along each of the arms of the U-shaped structure. The notches 110 are sized and shaped to receive the mounting blocks 96, 98. In particular, the mounting blocks 96, 98 are inserted axially, with respect to the intestine-conveying elements 64, 66, from a side of the U-shaped support member 104 opposite the intestine-conveying elements 64, 66. The support flanges 106, 108 are coupled to an outer surface of the U-shaped support member 104, in vertical alignment with a respective notch 110. The notches and support flanges 106, 108 cooperatively define a pair of channels 102 of the adjustable mount 94.

The adjustment mechanism 100 is configured to adjust a position of the mounting blocks 96, 98 relative to each other and thereby adjust the spacing between the first and second intestine-conveying elements 64, 66. As discussed above, the channels 102 retain the mounting blocks 96, 98 and permit sliding of blocks 96, 98 therein. In the exemplary embodiment, the first mounting block 96 is positioned at the bottom of the channel 102 while the second mounting block 98 is positioned within the channel 102 above the first mounting block 96. As will be described, the second mounting block 98 is slidable within the channel relative to the first mounting block 96.

The adjustment mechanism 100 includes an elongated shaft 112 to which the mounting blocks 96, 98 are operably coupled so that relative positioning of the mounting blocks on the shaft is adjustable. In a preferred embodiment, the first mounting block 96 includes a receiving bore (not shown) for receiving the elongated shaft 112. A securing mechanism 114 is attached to the elongated shaft 112 and operable to secure the elongated shaft 112 to the first mounting block 96 at a predetermined extension length from the first mounting block 96. In one example, the first mounting block 96 includes a threaded bore (not shown), the elongated shaft 112 is externally threaded, and the securing mechanism 114 comprises a threaded nut. The nut is threaded onto the threaded shaft 112. The threaded shaft 112 is threaded into the threaded bore a desired amount. The nut is then tightened against the top surface of the first mounting block 96 to fixedly interconnect the threaded shaft 112 and first mounting block 96.

To provide adjustable positioning of the second mounting block 98 relative to the first mounting block 96, the engagement of the threaded shaft 112 with the first mounting block 96 is adjusted. More particularly, the second mounting block 98 rests on a top end of the threaded shaft 112 (the threaded shaft preferably comprises a bolt with an enlarged head to accommodate such engagement), whereby vertical shifting of the threaded shaft 112 moves the second mounting block 98 vertically. Therefore, when it is desired to decrease the spacing between the intestine-conveying rollers 64, 66, the securing nut 114 is loosened and rotated along the shaft 112 to provide spacing between the nut 114 and top surface of the first mounting block. The shaft 112 is threaded further into the first mounting block 96, and the securing nut 114 is then retightened. On the other hand, to increase the spacing between the blocks 96, 98, the securing nut is loosened, and the shaft 112 is rotated relative to the block 96 (preferably in a counterclockwise direction using the enlarged head) to shift the shaft 112 outwardly from the threaded bore in the first mounting block 96. The adjustment mechanism 100 also includes a locking element 116 to secure the second mounting block 98 in place. The illustrated locking element 116 comprises a thumb screw. In an embodiment, the locking element 116 is received in a threaded bore of a top plate 118 (or a threaded sleeve secured in alignment with the bore in the top plate) and is operable to exert a force against the second mounting block 98. (In the illustrated embodiment, a bolt 117 is secured to the second mounting block 98 (e.g., threaded into a counterbore extending from the top surface of the block 98) to extend upwardly and present a surface (the top of the head of the bolt 117), against which locking element 116 exerts its locking force. However, according to certain aspects of the present invention, the bolt 117 may be eliminated such that the locking element 116 exerts pressure directly against the top surface of the second mounting block 98.) The locking element 116 is loosened during adjustment of the spacing between the blocks 96, 98. Once the second mounting block 98 is located in the desired position relative to the first mounting block 96, the securing element 116 is shifted downwardly (by rotating the element 116 relative to the top plate 118) to exert locking force against the mounting block 98 (via the bolt 117). The force presses the second mounting block 98 against the elongated shaft 112, thereby securing the second mounting block 98 in place.

It will be appreciated certain aspects of the present invention contemplate the use of alternative adjustment mechanisms for varying the spacing between the intestine-conveying roller 64, 66. For example, a powered actuator (e.g., a hydraulic or air cylinder, linear motor, or other drive) may be coupled between the rollers to control spacing therebetween.

The frame assembly 62 of the squeeze conveyor 20 also includes a mounting bracket 120. In an embodiment, the adjustable mount 94 is attached to and supported by the mounting bracket 120. More particularly, each of the U-shaped support members 104 are coupled to the mounting bracket 120, for example, with one or more fasteners. In an example, the mounting bracket 120 is shaped to align the chute 74 generally with the drum 14 to facilitate the chute receiving the intestine from the drum. Referring back to FIG. 1, the mounting bracket 120 is coupled to a portion of the arcuate pan 42 proximate the unloading side 103.

The mounting bracket 120 is fabricated from a single blank of sheet material. Alternatively, the mounting bracket 120 may be fabricated from multiple blanks of sheet material, wherein the blanks are attached together at one or more seams to form the respective mounting bracket. In an embodiment, the sheet material may include any suitable sheet material, including, for example, and without limitation, an aluminum or aluminum alloy, a steel or steel alloy, and a plastic or resin material.

While the squeeze conveyor 20 is depicted in FIGS. 7-10 and described herein as including two (2) drum motors for the intestine-conveying elements 64, 66, it is noted that other designs may be utilized. For example, an alternative (unshown) squeeze conveyor may include a conveyor belt pair (two conveyor belts which are adjustably fixed relative to each other and revolve in opposite directions) for the intestine-conveying elements 64, 66, wherein the intestine 180 is conveyed therethrough to facilitate compressing the intestine to expel the fluid axially toward the open end 182 of the intestine 180. Such a squeeze conveyor may have a clamshell housing, including an upper housing partially enclosing the upper belt of the belt pair, and a lower housing partially enclosing the lower belt of the belt pair. The upper housing may pivot with respect to the lower housing about a pair of adjustable hinge assemblies. This may allow the squeeze conveyor to be opened, for example, to feed the intestine therein and/or to clean and remove debris from within the clamshell housing.

The alternative squeeze conveyor may include a drive mechanism. In the alternative example, the drive mechanism may be configured to drive at least one of the upper and lower belts, wherein the belts may function as the intestine-engaging surfaces of the intestine-conveying elements.

Figure 13:
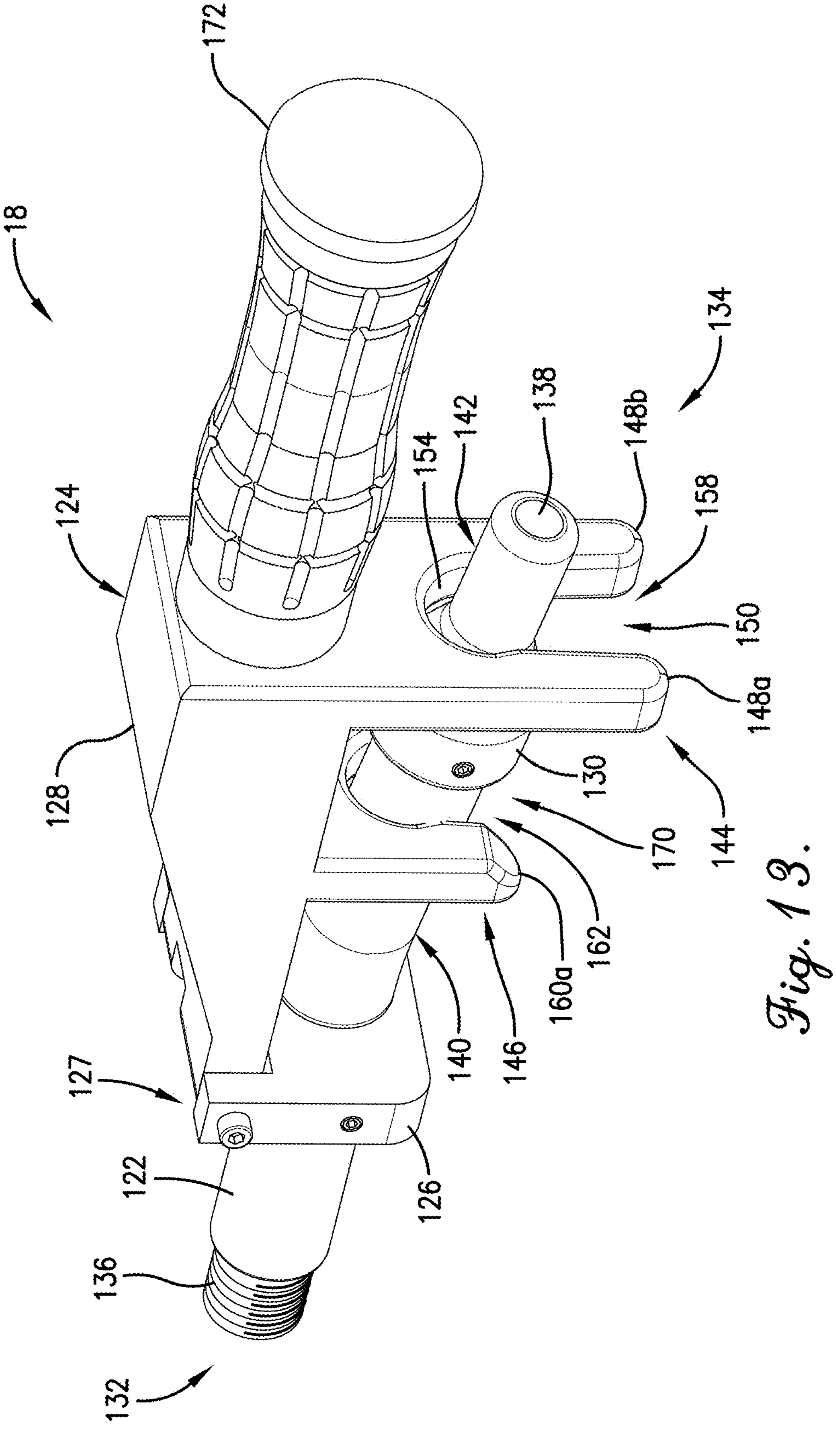
FIG. 13 is a perspective of the nozzle assembly similar to FIG. 11, but depicting the nozzle assembly in the closed position.

Referring to FIGS. 11-14, the nozzle assembly 18 includes an elongated outlet tube 122 and a pivotable intestine retainer assembly 124. The nozzle assembly also includes a nozzle clamp 126 configured to be attached along a length of the outlet tube 122. The retainer assembly 124 is shiftably attached to the nozzle clamp 126 at a connection location 127, so as to be swingable relative to the outlet tube 122 into and out of an intestine-securing position or closed position, as best depicted in FIG. 13. The retainer assembly 124 is operable to secure the open intestine end to the outlet tube 122 when in the intestine-securing position so that, when the open intestine end is received and secured on the outlet tube 122, fluid may be discharged into the intestine as the drum 14 (shown in FIG. 1) is rotated.

In the exemplary embodiment, the outlet tube 122 includes a cylindrical tube having a substantially circular cross-sectional shape (although alternative cross-sectional shapes, such as polygonal, are within the ambit of the present invention). The outlet tube 122 includes an inlet end 132 and an outlet end 134. At the inlet end 132, the outlet tube 122 includes a mechanical coupling 136 (i.e., a threaded connection), which is coupled to the fluid supply system 24 that provides fluid connection to a source of fluid. The outlet end 134 of the tube 122 has a fluid discharge opening 138. The outlet end 134 is configured for insertion into the open end 182 of the intestine 180, with the fluid discharge opening 138 located inside the intestine. The mechanical coupling 136 enables different nozzle assemblies (type, size, design, etc.) to be quickly and easily interchanged on the drum 14.

The outlet tube 122 includes a slight bend proximate the axial center of the tube. The bend is in a range between and including about five degrees (5°) and about ten degrees (10°). The bend facilitates keeping the outlet tube 122 close to the intestine-supporting surface 36 of the drum 14. In some embodiments, however, the outlet tube 122 may be a straight tube without any bends.

In the exemplary embodiment, the outlet tube 122 also includes a tapered collar 130 at the outlet end 134. The tapered collar 130 forms an enlarged portion of the outlet tube 122. In particular, the outlet tube 122 includes first and second spaced tube portions 140 and 142. These tube portions 140, 142 are separated by the enlarged portion of the tapered collar 130. The enlarged portion has a greater cross-sectional dimension than the tube portions 140, 142. In addition, in the example embodiment, the tube portion 140 has a larger diameter than the tube portion 142, although other diameter relationships are within the ambit of the present invention.

The enlarged portion of the tapered collar 130 tapers inward toward the discharge opening 138. The taper of the tapered collar 130 assists in the loading of the intestine by facilitating the smooth insertion of the outlet tube 122 into the open end 182 of the intestine 180. The tapered shape facilitates guiding the intestine over the outlet tube and helps create a secure fit for preventing disengagement during operation. The tapered collar 130 is secured to the outlet tube 122 using a fastener, for example. It is noted, however, that the tapered collar 130 may be secured thereto in any manner that enables the nozzle assembly 18 to function as described herein (e.g., welding, bonding, etc.).

The outlet tube 122 may be fabricated in various diameters to accommodate different animal types, such as larger diameters for cattle and smaller diameters for goats or other livestock. More particularly, the tube portion 142, which is part of the tapered collar 130, may be fabricated in various diameters. As such, the nozzle assembly 18 may be adjusted for different animal types by changing the tapered collar 130, rather than the entire nozzle assembly.

In the exemplary embodiment, the nozzle clamp 126 is attached to the outlet tube 122. The clamp 126 includes an aperture for receiving the outlet tube 122 and is adjustable along the tube. The clamp 126 can be fixed at a desired position using a fastener, which allows for flexibility in positioning the intestine retainer assembly 124 along the length of the outlet tube. Once set in the desired position, the fastener secures the clamp 126 in place, ensuring that the intestine retainer assembly 124 remains in the proper location during operation.

In the exemplary embodiment, the intestine retainer assembly 124 is operable to secure the open end 182 of the intestine 180 to the outlet tube 122. The intestine retainer assembly 124 is swingably coupled to the nozzle clamp 126. This allows the retainer assembly 124 to pivot into and out of the intestine-securing position (see FIGS. 11 and 13). The retainer assembly 124 includes a body or retainer mechanism 128 that includes two (2) spaced retainers 144 and 146 projecting from the body and configured to engage the outlet tube 122. The retainers 144, 146 cooperate with the outlet tube 122 tube to exert a gripping pressure against the intestine, thus ensuring that the intestine remains securely fastened to the outlet tube 122 during the cleaning operation.

The retainer 144 includes a pair of spaced flexible fingers **148*a* and 148*b* that define a tube-receiving channel 150. The outlet tube 122 is received within the channel 150 when the retainer assembly 124 is in the intestine-securing position. More particularly, the retainer 144 includes first and second walls 152*a* and 152*b* that define a channel base 154 and opposed channel sides 156*a* and 156*b* extending from the channel base 154 to a distal open channel end 158**.

In the example, each of the channel sides **156*a*, 156*b* is generally planar or flat. The channel base 154 has a generally circular or arcuate shape (although alternative shapes, such as polygonal, are within the ambit of the present invention). It is preferred, however, that the channel base 154 and the portion 142 of the outlet tube 122 received therein have generally complementary shapes. This allows the outlet tube 122 to be located immediately adjacent the channel base 154 when the intestine retainer assembly 124 is in the intestine-securing position. A spacing between the opposed channel sides 156*a*, 156*b* is preferably slightly undersized (or equivalent) relative to a cross-sectional dimension of the outlet tube 122 received therebetween, so as to slightly flex outward and exert a minimal force to the intestine between the outlet tube 122 and the channel sides 156*a*, 156*b* when loading and unloading the intestine. This flexing and minimal force facilitates maintaining the intestine retainer assembly 124 in the closed position during operation of the machine 10. If the spacing were oversized, for example, the retainer assembly 124** may inadvertently shift the opened position during drum rotation (perhaps primarily because of centrifugal force), which could lead to the intestine being disengaged.

The retainer 146 is formed substantially the same as the retainer 144. For example, the retainer 146 includes a pair of spaced flexible fingers **160*a* and 160*b* that define a tube-receiving channel 162. The outlet tube 122 is received within the channel 162 when the retainer assembly 124 is in the intestine-securing position. More particularly, the retainer 146 includes first and second walls 164*a* and 164*b* that define a channel base 166 and opposed channel sides 168*a* and 168*b* extending from the channel base 166 to a distal open channel end 170**.

In the example, each of the channel sides **168*a*, 168*b* is generally planar or flat. The channel base 166 has a generally circular or arcuate shape (although alternative shapes, such as polygonal, are within the ambit of the present invention). It is preferred, however, that the channel base 166 and the portion 140 of the outlet tube 122** received therein have generally complementary shapes. This allows the outlet tube 122 to be located immediately adjacent the channel base 166 when the intestine retainer assembly 124 is in the intestine-securing position. A spacing between the opposed channel sides 168*a*, 168*b* is preferably slightly undersized (or equivalent) relative to a cross-sectional dimension of the outlet tube 122 received therebetween, so as to slightly flex outward and exert a minimal force to the intestine between the outlet tube 122 and the channel sides 168*a*, 168*b* when loading and unloading the intestine.

In the example embodiment, the nozzle clamp 126 is positioned along the outlet tube 122 such that a first and second retainers 144, 146 straddle the tapered collar 130. That is, the second retainer 146 is spaced further from the discharge opening 138 than the first retainer 144. It is also noted the illustrated embodiment (with the enlarged diameter tapered portion 130 located between the retainer 144, 146) further facilitates gripping of the intestine between the retainer mechanism 128 and outlet tube 122. More specifically, during use, a portion of the intestine tends to gather and bunch up between the retainers 144, 146, such that the constricted spaced between the tapered portion 130 and the underside of the retainer body 128 enhances gripping of the intestine by the outlet tube 122 and retainer assembly 124.

To facilitate attachment/detachment of the retainer mechanism 128 to/from the outlet tube 122, the retainer mechanism 128 includes a handle portion 172 extending away from, or outwardly relative to, the connection point 127 of the pivotable retainer assembly 124. When the retainer assembly 124 is in the intestine-securing position, the handle portion 172 extends outwardly beyond the discharge opening 138 of the outlet tube 122, ensuring that a user can easily manipulate the retainer assembly 124 while maintaining secure placement of the intestine on the outlet tube 122. The handle portion 172 facilitates easy manual manipulation of the retainer assembly 124, allowing a user to move the retainer assembly 124 into and out of the intestine-securing position to secure/release the intestine.

Figure 15:
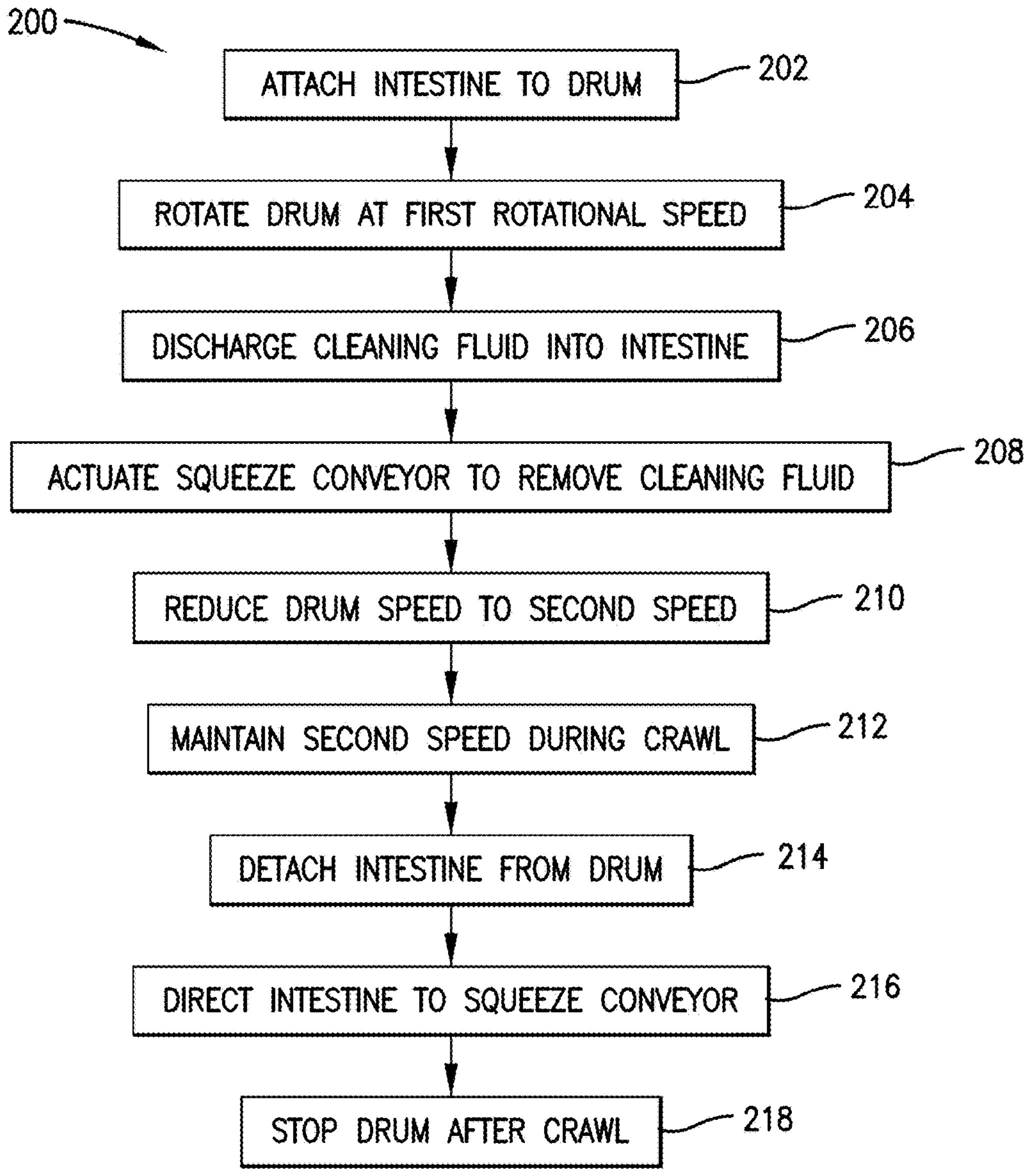
FIG. 15 is a flow chart of a method for cleaning an intestine using the intestine cleaning machine of FIG. 1.

FIG. 15 is a flow chart of a method 200 for cleaning an intestine using the intestine cleaning machine 10 shown in FIGS. 1-6. The operations described herein may be performed in the order shown in FIG. 15 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The method 200 is described below, for ease of reference, as being executed, at least in part, by the controller 57 (see FIG. 16). While operations within the method 200 are described below regarding the controller 57, the method 200 may, according to some aspects of the present invention, be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In operation, the drum 14 is positioned at a "home" position for loading intestines thereon. In particular, the drum is positioned such that the nozzle assembly 18 is generally horizontal relative to the center rotational axis "A" of the drum 14, on the loading side 101 of the cleaning machine 10. When in the home position, the nozzle assembly 18 is pointing generally vertically downward toward the floor surface.

At operation 202, the intestine 180 is attached to the rotatable drum 14. More particularly, the open end 182 of the intestine 180 is secured on the nozzle assembly 18. If the handle portion 172 of the pivotable retainer mechanism 128 engages the outlet tube 122 (such that the retainer assembly 124 is in the closed position), an operator first pulls the handle portion 172 away from the outlet tube 122 (or shifts the retainer assembly 124 to the opened position). As depicted in FIGS. 1-6, the nozzle assembly 18 is securely coupled to the rotatable drum 14, which provides the support for the intestine 180 during cleaning.

The open end 182 of the intestine 180 is placed over the outlet end 134 of the outlet tube 122, extending along the tube past the enlarged portion of the tapered collar 130 and onto the tube portion 146. The pivotable retainer mechanism 128 is rotated toward the outlet tube 122, for example, via the handle portion 172, wherein the first and second retainers 144, 146 pass over the intestine 180 and outlet tube 122. The retainers 144, 146 cooperate with the outlet tube 122 tube to exert a gripping pressure against the intestine 180, thereby attaching the intestine securely to the outlet tube 122. As previously noted, the intestine 180 typically does not lie flat and smoothly against the outlet tube 122 as depicted, but rather a portion of the intestine 180 gathers and bunches up in the area between the retainers 144, 146, and the tapered collar 130 and retainer mechanism 128 further engage and grip the intestine 180 to prevent unintended disconnection of the intestine.

At operation 204, the drum 14 is rotated at a first rotation speed to load the intestine 180 onto the drum 14. In particular, the controller 57 actuates the drive mechanism 16, for example, by actuating a relay to transfer electric power to the motor 54 of the drive mechanism. It is noted that the machine 10 is preferably only be operated by means of a two-hand start controller. That is, an operator must trigger the two-hand start controller to start drum rotation and begin the intestine cleaning process via use of both of the operator's hands. This facilitates ensuring that the operator's hands are clear of the machine 10.

At operation 206, a cleaning fluid is discharged into the intestine 180 during rotation of the drum. For example, substantially simultaneously with actuation of the motor 54, the controller 57 actuates the solenoid shut-off valve 25 to open the valve, thereby enabling the cleaning fluid (preferably water, although other suitable fluids are within the ambit of the present invention) to flow to the nozzle assembly 18 where the fluid is injected into the open end 182 of the intestine 180.

At operation 208, the intestine squeeze conveyor 20 is actuated to compress and facilitate removal of the cleaning fluid from the intestine 180. In particular, the controller 57 actuates one or more of the intestine-conveying elements 64, 66 to convey and compress the intestine 180 therebetween. It will be appreciated that the illustrated intestine squeeze conveyor 20 does not convey or compress the intestine 180 until it has been unloaded from the drum 14 (at least to the extent that the open end of the intestine can be fed into the squeeze conveyor 20).

After the occurrence of operations 202, 204, and 206, the intestine 180 is pulled onto the intestine-supporting surface 36 as the drum 14 rotates at the first rotation speed. At the same time, the cleaning fluid flows into the intestine 180 from the nozzle assembly 18. As noted above, the flighting 48 helps arrange the intestine in a single helical layer around the drum 14. The preferred embodiment has the intestine loading being performed on one side of the drum 14 so that the drum 14 rotates away from the loading side 101, thereby pulling the intestine onto and over the drum 14.

During rotation of the drum 14 at the first rotation speed, the controller 57 receives electronic position signals, or operational feedback, from the encoder assembly 55 associated with the drive mechanism 16. The controller 57 uses these signals or feedback to adjust the drum rotation speed. For example, the controller 57 may use the signals or feedback to adjust the drum rotation speed dynamically based on the signals or operational feedback. The signals or operational feedback may include, for example, angular position data from the drive mechanism 16. In addition, the controller 57 senses the rotation of the drum 14 and keeps a record of the number of complete turns that the drum completes.

During the loading phase of the intestine 180 onto the drum 14, the controller 57 commands the motor 54 to rotate at the first rotation speed, which may be set by an operator of the machine 10 during a setup or calibration operation. The drum speed may be adjusted to complete the loading in approximately thirty (30) seconds. Furthermore, during the loading phase, the spray nozzles 22 operate to clean the exterior of the intestine by spraying fluid onto the outside of the intestine while the drum 14 is rotating. Fluid is supplied to the spray nozzles 22 from the fluid source by the fluid supply system 24. The exterior of the intestine is cleaned automatically as it is supported on the drum 14. It will be appreciated, however, that other suitable methods of cleaning the outside of the intestine are entirely within the ambit of the present invention. For example, the machine may alternatively be provided with multiple spray bars, an alternatively configured bar(s) (e.g., a tubular bar having spaced apart openings), a handheld spray wand, a moveable sprayer, brushes, etc.

As described above, the collection pan 46 is positioned below the arcuate pans 40, 42, and 44. The collection pan 46 extends along the length of the drum 14 and is configured to collect the debris and fluid discharged from the intestine and the spray nozzles 22. Although not illustrated, the collection pan 46 is in fluid communication with a suitable drain. In fact, the machine 10 may alternatively be designed so that fluid and debris from the intestine falls directly to the floor (not shown) on which the frame rests, with the floor preferably having a suitable drain or collection basin associated therewith.

At operation 210, the rotation speed of the drum 14 is reduced to a second rotation speed. For example, after the controller 57 senses that the drum 14 has rotated a set number of revolutions, such as about five (5) to seven (7) complete revolutions, the controller 57 actuates the solenoid shut-off valve 25 to close the valve, thereby restricting or preventing the cleaning fluid (e.g., water) from flowing to the nozzle assembly 18 and the spray nozzles 22. Additionally, the controller 57 commands the motor 54 to rotate at the second rotation speed, which may be set by an operator of the machine 10 during a setup or calibration operation. The second rotation speed is slower than the first rotation speed commanded during the intestine loading phase. As such, it may be said that the drum “crawls” during this reduced speed phase, or operates during a crawl phase.

At operation 212, rotation of the drum at the second rotation speed is maintained during the crawl phase. For example, the drum 14 rotates at the second rotation speed from the home position to an unloading position on the side of the drum 14 opposite the loading position.

At operation 214, the intestine 180 is detached from the drum 14 during the crawl phase. In particular, as the nozzle assembly 18 passes by the unloading position on the unloading side 104, an operator detaches the intestine from the drum 14. In particular, the operator pulls the handle portion 172 of the pivotable retainer mechanism 128 away from the outlet tube 122. The open end 182 of the intestine 180 is removed from the nozzle assembly 18 (by sliding the open end of the intestine 180 off the outlet tube 122 while the retainer assembly 124 is in the opened position).

At operation 216, the intestine 180 is fed or directed into the squeeze conveyor 20 as the drum 14 continues to rotate at the reduced, second rotation speed. For example, the operator may pass the open (disconnected) end of the intestine through the intestine-receiving chute 74. The intestine 180 moves through the chute 74 to the chute discharge location 86 adjacent the intestine-receiving location 92 of the squeeze conveyor 20. The remaining portion of the intestine 180 should be pulled into the squeeze conveyor 20 as the drum 14 rotates during the crawl phase. The operator may push the pivotable retainer mechanism 128 back onto the outlet tube 122 (into the closed position of the retainer assembly 124) to ensure no interference with the drum rotation. Although the preferred embodiment involves simultaneous unloading of the intestine 180 from the drum 14 and compression by the squeeze conveyor 20, it is also within the ambit of some aspects of the present invention for the intestine 180 to instead be fully unloaded from the drum 14 and subsequently fed through squeeze conveyor 20.

After the controller 57 senses that the drum 14 has returned to the home position at the reduced, second rotation speed (i.e., completes one revolution or less in the crawl phase), at operation 218 rotation of the drum 14 is preferably stopped. For example, the controller 57 may command the motor 54 to stop by opening a relay and removing electrical power therefrom. Substantially simultaneously, the controller 57 may actuate the drive mechanism(s) of the squeeze conveyor 20, commanding it to stop, for example, by cutting electric power therefrom. This prevents the squeeze conveyor 20 from continuing to pull on the intestine 180 wound on the drum 14 while the drum is stationary. In certain embodiments, however, a complete stoppage of the drum 14 is not required. For example, the drum may continue to “crawl” at the reduced, second rotation speed during attachment of a subsequent intestine. The controller 57 may command the motor 54 to increase rotation speed to the first speed at a predetermined drum rotational angle, for example.

After an operator loads a new, second intestine on the nozzle assembly 18, as discussed above, the process is repeated. As the second intestine is wound onto the drum 14, the first intestine is pulled from the drum 14 by the squeeze conveyor 20. Additionally, any residual water contained in the intestine is removed or “squeezed” from the intestine by the intestine-conveying elements 64, 66 of the squeeze conveyor 20.

In an alternative embodiment, during rotation of the drum 14 at the first rotation speed, the controller 57 may receive electronic position signals, or operational feedback, from the encoder assembly 55 associated with the drive mechanism 16 and the encoder assemblies associated with the intestine-conveying elements 64 and 66. The controller 57 may use these signals or feedback to synchronize a conveying speed of the intestine-conveying elements 64, 66 with the drum rotation speed. For example, the controller 57 may use the signals or feedback to adjust the drum rotation speed and/or adjust the conveying speed dynamically based on the signals or operational feedback. The signals or operational feedback may include, for example, first angular position data from one or more of the intestine-conveying elements 64, 66 and second angular position data from the drive mechanism 16. In this manner, the controller 57 ensures that neither drive runs faster or slower than the other, which could result in the intestine 180 being bunched up on the drum 14 or in the chute 74 and/or overly stretched by the squeeze conveyor 20.

In another embodiment, the controller 57 may be configured to alternately actuate the solenoid shut-off valve 25 during specified periods and/or angular positions of the drum 14 during drum rotation. This allows a reduction in the amount of cleaning fluid needed to clean the inside of the intestine. For example, the controller may actuate the valve 25 to cycle it between the “on” and “off” positions at least once per revolution of the drum 14 and may substantially prevent cleaning fluid flow during about one half (½) of each revolution, based on encoder position signals. It is also foreseen that a valve 25 may cycle between “on” and “off” positions, and/or between other reduced flow rate positions, more or fewer times per revolution without departing from the spirit of the present invention.

In one example, the controller 57 may actuate the valve 25 to prevent fluid flow when a discharge direction of the nozzle assembly 18 has a generally upward component (i.e., as the nozzle assembly is positioned on the unloading side of the drum), and actuate the valve 25 to allow flow when a discharge direction has a generally downward component (i.e., as the nozzle assembly is positioned on the loading side of the drum). As the drum 14 rotates in a first half-revolution, the nozzle assembly 18 discharges fluid into the intestine. The rotation of the drum 14, in combination with gravity, allows for a relatively low volume of low pressure fluid to provide a highly effective cleaning of the intestine while leaving the microvilli membrane intact and inside the intestine.

A relatively low fluid flow is preferably discharged from the nozzle assembly 18 and falls by gravity into the lower portion of the intestine (i.e., to the portion of the intestine near the bottom of drum 14). The small volume of fluid remains at the bottom of the drum 14 as a result of gravity and, because the intestine is wrapped around the drum 14, the fluid naturally flows through the intestine toward the unconnected, free distal end of the intestine. It is understood that each time the nozzle assembly 18 passes over top dead center (i.e., the twelve o’clock position when viewing FIG. 1), a quantity of fluid is caught within the first round (the first convolution of the intestine around the drum 14) of the intestine and this quantity of fluid flushes through the remaining rounds of the intestine as the drum 14 rotates.

Moreover, in this embodiment, as the nozzle assembly 18 passes over top dead center, the controller 57 may actuate the valve 25 to substantially restrict or prevent cleaning fluid flow to the nozzle assembly 18 during the subsequent half-revolution of the drum 14. This reduces the amount of cleaning fluid needed to clean the intestine 180 and eliminates the need of the nozzle pressure having to overcome gravity in supplying fluid to the intestine 180. This also permits use, if desired, of a higher pressure/flow rate cleaning fluid flow during the other segments of rotation—i.e., when the nozzle assembly 18 expels cleaning fluid in a direction having a generally downward component.

Throughout multiple revolutions of the drum 14, quantities of cleaning fluid remain at the bottom of the drum 14 as the fluid moves toward the distal end of the intestine. The fluid is preferably of sufficient volume to entirely immerse the inner circumference of the intestine along at least a noticeable segment of each round, without filling each round. The fluid and debris preferably exits the distal end of the intestine as the drum 14 rotates.

Figure 16:
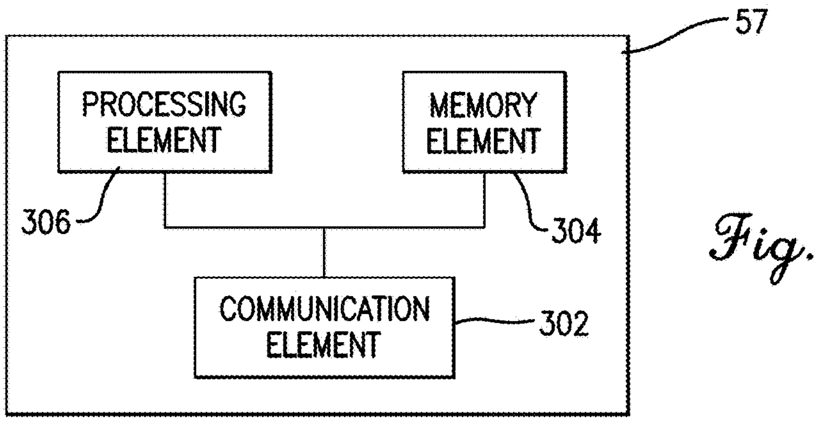
FIG. 16 is a schematic of a controller for use with the intestine cleaning machine of FIG. 1.

FIG. 16 is a schematic of the controller 57 for use with the intestine cleaning machine 10 (shown in FIG. 1). The controller 57 may broadly include a communication element 302, a memory element 304, and a processing element 306.

The communication element 302 generally allows communication with external systems or devices, such as via wired or wireless communication and/or data transmission. The communication element 302 may include signal or data transmitting and receiving circuits, such as antennas, amplifiers, filters, mixers, oscillators, digital signal processors (DSPs), and the like. The communication element 302 may establish communication wirelessly by utilizing RF signals and/or data that comply with communication standards such as cellular 2G, 3G, or 4G, WiFi, WiMAX, Bluetooth™, and the like, or combinations thereof. In addition, the communication element 302 may utilize communication standards such as ANT, ANT+, Bluetooth™ low energy (BLE), the industrial, scientific, and medical (ISM) band at 2.4 gigahertz (GHz), or the like.

Alternatively, or in addition, the communication element 302 may establish communication through connectors or couplers that receive metal conductor wires or cables which are compatible with networking technologies, such as ethernet. In certain embodiments, the communication element 302 may also couple with optical fiber cables. The communication element 302 may be in communication with the corresponding processing element 306 and the memory element 304, via, e.g., wired or wireless communication.

The memory element 304 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 304 may be embedded in, or packaged in the same package as, the corresponding processing element 306. The memory element 304 may include, or may constitute, a “computer-readable medium.” The memory element 304 may store the instructions, code, code segments, software, firmware, programs, applications, apps, modules, agents, services, daemons, or the like that are executed by the processing elements. The memory element 304 may also store settings, data, documents, databases, and the like.

The processing element 306 may include electronic hardware components such as processors. The processing element 306 may include digital processing unit(s). The processing element 306 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 306 may generally execute, process, or run instructions, code, code segments, software, firmware, programs, applications, apps, modules, agents, processes, services, daemons, or the like. The processing element 306 may also include hardware components such as finite-state machines, sequential and combinational logic, and other electronic circuits that can perform the functions necessary for the operation of the current invention. The processing element 306 may be in communication with the other electronic components through serial or parallel links that include address busses, data busses, control lines, and the like.

Through hardware, software, firmware, or combinations thereof, the processing element 306 may be configured or programmed to perform the functions described herein above.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

What is claimed is:

1. An intestine cleaning machine for cleaning an intestine having an open intestine end, the intestine cleaning machine comprising:
- a rotatable drum presenting an intestine-supporting surface;
- a nozzle assembly coupled to the drum,
- the nozzle assembly operable to discharge a cleaning fluid into the intestine as the drum is rotated; and
- an intestine squeeze conveyor assembly comprising:
  - a frame assembly, and
  - first and second spaced apart intestine-conveying elements configured to receive the intestine therebetween,
  - the intestine-conveying elements cooperatively defining opposed intestine-engaging surfaces that are moveable in a common direction,
  - at least one of the intestine-conveying elements being adjustably supported relative to the frame assembly to permit adjustment of a spacing between the intestine-conveying elements, such that adjustment of the spacing between the intestine-conveying elements permits pressure to be exerted against the intestine as the intestine is moved by and between the intestine-engaging surfaces.

2. The intestine cleaning machine in accordance with claim 1,
- the first intestine-conveying element being drivable.

3. The intestine cleaning machine in accordance with claim 2,
- the first intestine-conveying element including an outer rotatable roller and an internal motor.

4. The intestine cleaning machine in accordance with claim 1,
- the intestine conveying elements each comprising a single rotatable roller.

5. The intestine cleaning machine in accordance with claim 1 further comprising:
- an electric motor drivingly coupled to the rotatable drum,
- at least one of the intestine-conveying elements including a drive motor so as to be driven thereby; and
- a controller operably coupled to the electric motor and the drive motor,
- the controller operable to:
  - drive the electric motor and the drive motor in a synchronized manner relative to each other, and
  - control a rotation speed and a rotation direction of the electric motor and the drive motor independently.

6. The intestine cleaning machine in accordance with claim 1,
- the intestine-conveying elements being driven synchronously with respect to each other.

7. The intestine cleaning machine in accordance with claim 1,
- the intestine squeeze conveyor assembly further comprising:
  - an intestine-receiving chute for directing the intestine from the drum to the intestine-conveying elements,
  - the intestine-engaging surfaces defining an intestine-receiving location,
  - the intestine-receiving chute defining a discharge location adjacent the intestine-receiving location.

8. The intestine cleaning machine in accordance with claim 7,
- the intestine-receiving chute comprising:
  - a chute feed end, and
  - a chute discharge end,
- the chute discharge end defining the discharge location.

9. The intestine cleaning machine in accordance with claim 8, the intestine-receiving chute including a pair of opposed funneling panels that have at least portions thereof that converge toward each other in a direction extending from the chute feed end toward the chute discharge end, the pair of opposed funneling panels presenting a discharge spacing dimension adjacent the chute discharge end, the discharge spacing dimension being determined according to a target dimension ratio of the spacing between the intestine-conveying elements to the discharge spacing dimension, the target dimension ration being in a range between and including about 1:5 to 1:7.

10. The intestine cleaning machine in accordance with claim 1, the nozzle assembly including:

an outlet tube presenting a fluid discharge opening, the outlet tube being configured for insertion into the open intestine end so that the fluid discharge opening is located within the intestine, and an intestine retainer assembly shiftable relative to the outlet tube into and out of an intestine-securing position, said intestine retainer assembly being operable to secure the open intestine end to the outlet tube when in the intestine-securing position so that, when the open intestine end is received and secured on the outlet tube, fluid may be discharged into the intestine as the drum is rotated.

* * * * *